(12) United States Patent
Sugiyama et al.

(10) Patent No.: US 11,632,334 B2
(45) Date of Patent: Apr. 18, 2023

(54) COMMUNICATION APPARATUS AND COMMUNICATION METHOD

(71) Applicants: FUJITSU LIMITED, Kawasaki (JP); RIKEN, Wako (JP)

(72) Inventors: Junichi Sugiyama, Kawasaki (JP); Katsuya Tsushita, Saitama (JP); Kentaro Sano, Wako (JP); Tomohiro Ueno, Wako (JP)

(73) Assignees: FUJITSU LIMITED, Kawasaki (JP); RIKEN, Wako (JP)

( * ) Notice: Subject to any disclaimer, the term of this patent is extended or adjusted under 35 U.S.C. 154(b) by 0 days.

(21) Appl. No.: 17/468,052

(22) Filed: Sep. 7, 2021

(65) Prior Publication Data
US 2022/0086096 A1 Mar. 17, 2022

(30) Foreign Application Priority Data
Sep. 11, 2020 (JP) .............................. JP2020-152679

(51) Int. Cl.
| | |
|---|---|
| *H04L 47/263* | (2022.01) |
| *H04L 47/11* | (2022.01) |
| *H04L 49/90* | (2022.01) |
| *H04L 47/31* | (2022.01) |
| *H04L 47/25* | (2022.01) |
| *H04L 47/6275* | (2022.01) |

(52) U.S. Cl.
CPC ............ *H04L 47/263* (2013.01); *H04L 47/11* (2013.01); *H04L 47/25* (2013.01); *H04L 47/31* (2013.01); *H04L 47/6275* (2013.01); *H04L 49/9084* (2013.01)

(58) Field of Classification Search
CPC ....... H04L 47/263; H04L 47/11; H04L 47/25; H04L 47/31; H04L 47/6275; H04L 49/9084; Y02D 30/50
See application file for complete search history.

(56) References Cited

U.S. PATENT DOCUMENTS

| | | | |
|---|---|---|---|
| 2009/0201816 A1 | 8/2009 | Takahashi | |
| 2014/0204754 A1* | 7/2014 | Jeong | H04W 28/0231 370/235 |

(Continued)

FOREIGN PATENT DOCUMENTS

| | | |
|---|---|---|
| JP | 06-177913 A | 6/1994 |
| JP | 2001-217867 A | 8/2001 |
| JP | 2009-194488 A | 8/2009 |

*Primary Examiner* — Omer S Mian
(74) *Attorney, Agent, or Firm* — Staas & Halsey LLP

(57) ABSTRACT

A first node and a second node transmit packets to a third node via a switch. The packets are buffered in a Tx buffer in the switch and then transmitted to the third node. When the third node detects a sign of congestion at the Tx buffer based on the reception frequency of the packets, it is recognized, from transmitter addresses included in the received packets, that the nodes transmitting the packets to the third node are the first node and the second node, and a control packet for a transmission stop request is transmitted to the first node and the second node. On receiving the control packet for a transmission stop request, the first node stops transmission of only packets addressed to the third node. On receiving the control packet for a transmission stop request, the second node stops transmission of only packets addressed to the third node.

8 Claims, 20 Drawing Sheets

(56) References Cited

U.S. PATENT DOCUMENTS

2019/0342217 A1* 11/2019 Mazurek ................ H04L 47/12
2020/0120029 A1*  4/2020 Sankaran ................ H04L 12/44
2021/0320866 A1* 10/2021 Le .......................... H04L 49/50

* cited by examiner

| | SETTING | EXAMPLE SET VALUES |
|---|---|---|
| b1 | VALID DATA REGION | |
| b1-1 | MONITORING CYCLE (WHEN DETECTING A SIGN OF CONGESTION) | 1 μs |
| b1-1 | CONGESTION SIGN DETECTION THRESHOLD | 10000 Bytes |
| b1-1 | PROTECTIVE STEPS (WHEN DETECTING A SIGN OF CONGESTION) | 3 TIMES |
| b1-2 | MONITORING CYCLE (FOR DISAPPEARANCE OF SIGN OF CONGESTION) | 1 μs |
| b1-2 | CONGESTION SIGN DISAPPEARANCE THRESHOLD | 5000 Bytes |
| b1-2 | PROTECTIVE STEPS (FOR DISAPPEARANCE OF SIGN OF CONGESTION) | 5 TIMES |
| b2 | PACKET INTERVAL | |
| b2-1 | MONITORING CYCLE (WHEN DETECTING A SIGN OF CONGESTION) | 1 μs |
| b2-1 | CONGESTION SIGN DETECTION THRESHOLD | 5 Bytes |
| b2-2 | MONITORING CYCLE (FOR DISAPPEARANCE OF SIGN OF CONGESTION) | 3 μs |
| b2-2 | CONGESTION SIGN DISAPPEARANCE THRESHOLD | 13 Bytes |
| b3 | DELIMITER | |
| b3-1 | MONITORING CYCLE (WHEN DETECTING A SIGN OF CONGESTION) | 1 μs |
| b3-1 | CONGESTION SIGN DETECTION THRESHOLD | 4 octets |
| b3-2 | MONITORING CYCLE (FOR DISAPPEARANCE OF SIGN OF CONGESTION) | 2 μs |
| b3-2 | CONGESTION SIGN DISAPPEARANCE THRESHOLD | 8 octets |

COMMUNICATION APPARATUS AND COMMUNICATION METHOD

CROSS-REFERENCE TO RELATED APPLICATION

This application is based upon and claims the benefit of priority of the prior Japanese Patent Application No. 2020-152679, filed on Sep. 11, 2020, the entire contents of which are incorporated herein by reference.

FIELD

The embodiments discussed herein are related to a communication apparatus and a communication method.

BACKGROUND

In recent years, there have been advances in a technology called High Performance Computing (HPC) where high-speed computation is achieved by operating a plurality of inter-connected computers on a network as a single system.

With HPC, to realize high-speed computation with a large number of operations performed as distributed parallel processing, a network is constructed by interconnecting computer-based nodes. Switches are also used on this type of network to reduce the number of physical ports provided at each node, to flexibly connect the nodes, and to facilitate system expansion. Ethernet (registered trademark) is widely used as a communication protocol for networks where nodes are connected via switches.

As one example of a related technology, a technique has been proposed that monitors for congestion of packets that are supplied via a switch and notifies an input/output port of the transmitter of the packets when congestion has been detected. A technique that performs back pressure control in the upstream direction in units that are combinations of input ports and priority classes at a position upstream of a crosspoint switch used as a packet switch has also been proposed. In another proposed technology, a pause means for performing flow control in full-duplex communication is provided and flow control is performed according to a pause level determined based on the occupancy of a reception buffer and the processing load.

See, for example, Japanese Laid-open Patent Publication No. 06-177913, Japanese Laid-open Patent Publication No. 2001-217867, and Japanese Laid-open Patent Publication No. 2009-194488.

In conventional packet relaying, when it appears that packets being buffered by an Ethernet switch will overflow and cause congestion, a switch will send a Pause packet to stop the transmission of packets by the transmitter node, which stops congestion from occurring.

However, since the Pause packet generated by the switch is sent as a multicast packet and is received by every node on the network, every node will collectively stop transmitting packets. Since nodes which are not transmitting packets related to the potential congestion will also stop transmitting packets, there are the problems of a fall in transmission efficiency and deterioration in the quality of the communication service.

SUMMARY

According to one aspect, there is provided a communication apparatus including: a communication port that receives packets transmitted from a switch; and a control unit that monitors a reception frequency of the packets received at the communication port, detects a sign of congestion at a buffer inside the switch based on the reception frequency, and sends, based on a result of the detecting, a transmission stop request for the packets to a transmitter apparatus that transmits the packets before the buffer becomes congested.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 depicts specific examples of set values;

DESCRIPTION OF EMBODIMENTS

Several embodiments will be described below with reference to the accompanying drawings.

First Embodiment

Figure 1:
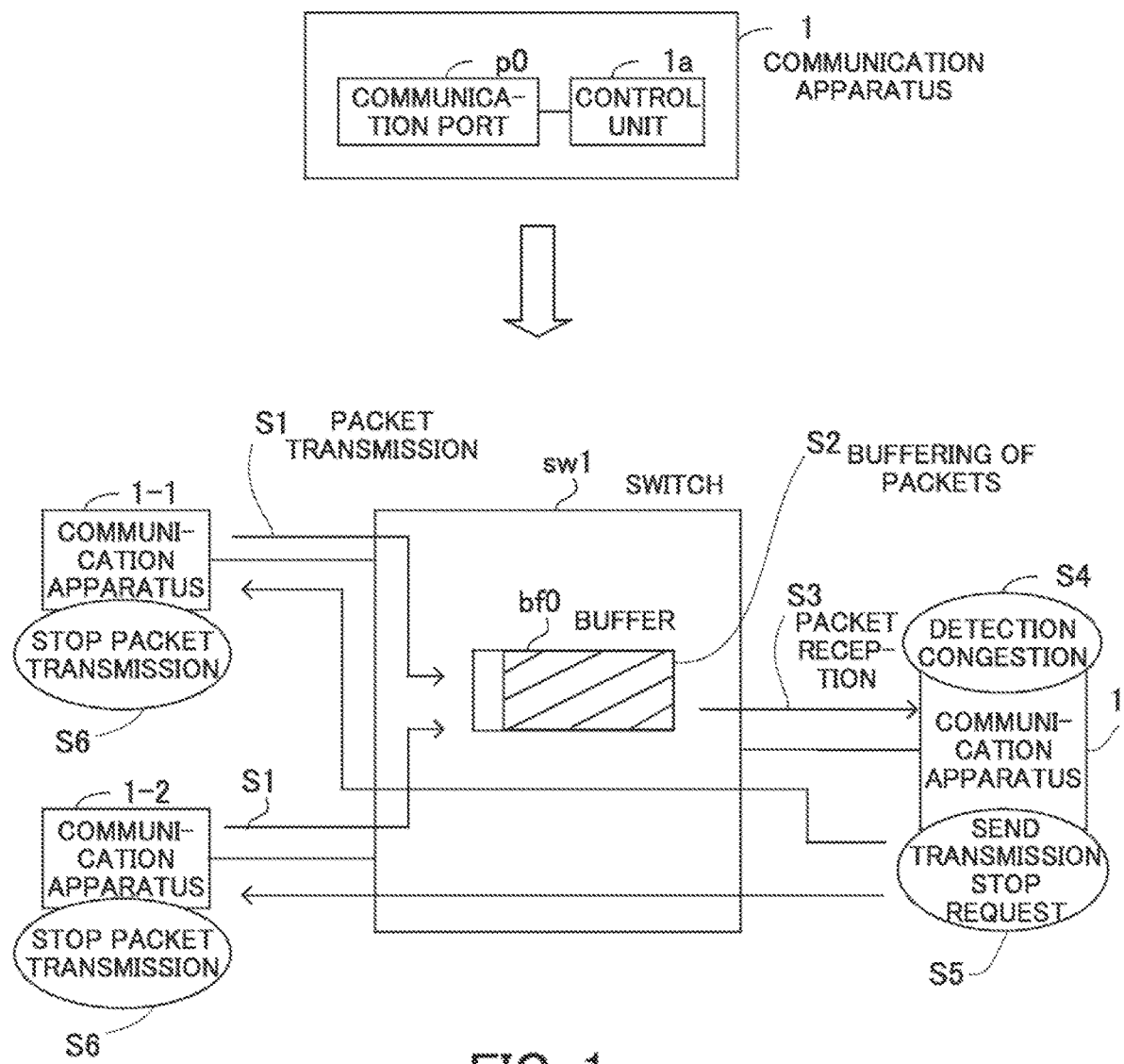
FIG. 1 depicts one example of a communication apparatus.

FIG. 1 depicts one example of a communication apparatus. A communication apparatus 1 includes a control unit 1a and a communication port p0. The communication port p0 receives packets transmitted from a switch.

The control unit 1a monitors the reception frequency of packets received at the communication port p0 and detects, based on the reception frequency, any sign of congestion at a buffer inside the switch. Based on the detection result, the control unit 1a sends a transmission stop request for packets to a transmitter apparatus of the packets before the buffer becomes congested.

Note that the functions of the control unit 1a are realized by a processor (not illustrated) provided in the communication apparatus 1 executing a predetermined program.

The operation will now be described with reference to the example in FIG. 1. The communication apparatus 1 and communication apparatuses 1-1 and 1-2 are connected to a switch sw1. The switch sw1 includes a buffer bf0 that buffers packets.

(Step S1) The communication apparatuses 1-1 and 1-2 transmit packets to the communication apparatus 1 via the switch sw1.

(Step S2) The buffer bf0 inside the switch sw1 buffers the packets.

(Step S3) The communication port p0 inside the communication apparatus 1 receives the packets transmitted via the switch sw1.

(Step S4) The control unit 1a of the communication apparatus 1 monitors the reception frequency of packets received at the communication port p0 and detects any sign of congestion at the buffer bf0 based on the reception frequency.

(Step S5) When the control unit 1a has detected that there is a sign of congestion at the buffer bf0, the control unit 1a transmits a transmission stop request to the communication apparatuses 1-1 and 1-2.

(Step S6) On receiving the transmission stop request, the communication apparatuses 1-1 and 1-2 stop transmission of only packets addressed to the communication apparatus 1.

As described above, in a network environment where a plurality of communication apparatuses are interconnected via a switch, the communication apparatus 1 detects any sign of congestion at a switch from the reception frequency of packets, and sends a packet transmission stop request to transmitter apparatuses of the packets before the congestion actually occurs.

In the past, when a buffer at a switch was about to overflow, a multicast Pause packet was outputted from the switch, resulting in packet transmission being stopped from every apparatus.

With the present embodiments however, when the communication apparatus 1 detects a sign of congestion at a switch, a transmission stop request for packets is sent only to apparatuses that are transmitting the packets that caused the sign of congestion. By doing so, it is possible to efficiently avoid congestion without stopping packet transmission by every apparatus, and therefore possible to improve transmission efficiency and the quality of the communication service.

Configuration of and Issues Faced by a Switch-Based HPC Network

Before describing the present embodiments in detail, the configuration of a typical switch-based HPC network and existing issues faced when avoiding congestion will be described with reference to FIGS. 2 to 7.

With HPC, a network in which many nodes with computers, such as CPUs (Central Processing Units), are interconnected plays an important role in realizing high-speed computation through the distributed parallel processing of a large number of operations.

In a ring-shaped network, the delay time will increase in proportion to the number of nodes. For this reason, a mesh configuration and a torus network, produced by linking the ends of a mesh, are typically used as the topology of an HPC network.

Figure 2:
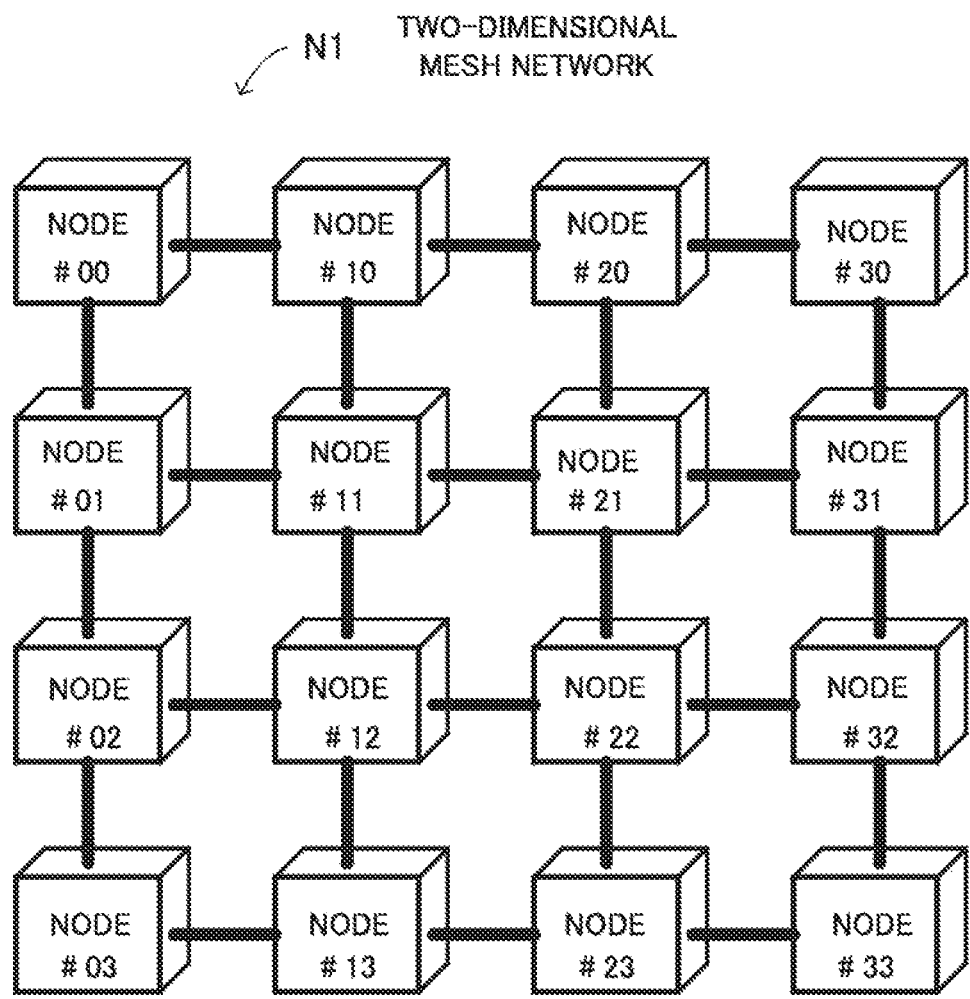
FIG. 2 depicts an example configuration of a two-dimensional mesh network.

FIG. 2 depicts an example configuration of a two-dimensional mesh network. A two-dimensional mesh network N1 includes nodes #00, ..., #03, #10, ..., #13, #20, ..., #23, and #30, ..., #33 and has these nodes connected in a mesh.

Figure 3:
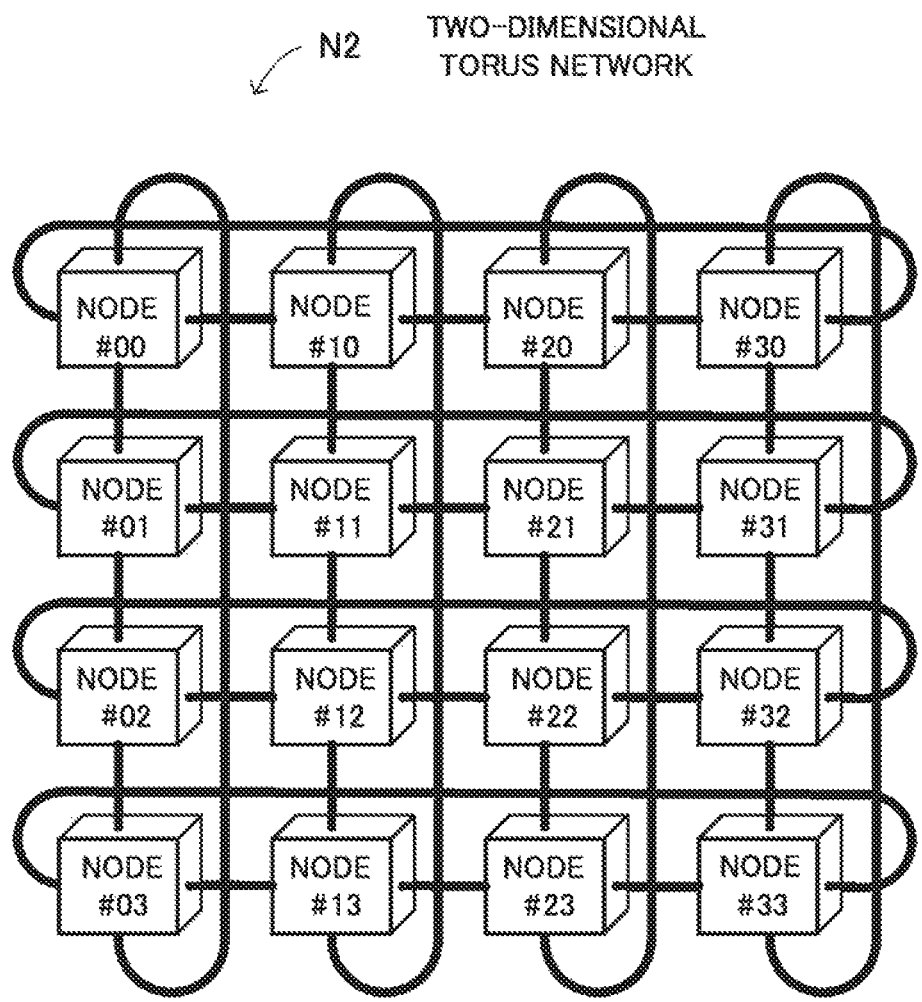
FIG. 3 depicts an example configuration of a two-dimensional torus network.

FIG. 3 depicts an example configuration of a two-dimensional torus network. A two-dimensional torus network N2 is a donut-shaped network (that is, a torus network) where the X-direction and Y-direction ends of the two-dimensional mesh network N1 depicted in FIG. 2 are also connected. Depending on the number of axes of the network connected to the nodes, the order of the network increases to three-dimensional, four-dimensional, or higher.

In a torus network, adjacent nodes are directly interconnected at a 1:1 ratio, which means that in a multidimensional torus network, the number of ports to be provided at each node increases in keeping with the order of the network.

For this reason, switches are used to reduce the number of physical ports at a node, to provide flexible connectivity between nodes, and to facilitate expansion. To produce a plurality of links in a virtual topology that uses only one physical port at a node, communication on each virtual link is performed according to time division.

Figure 4:
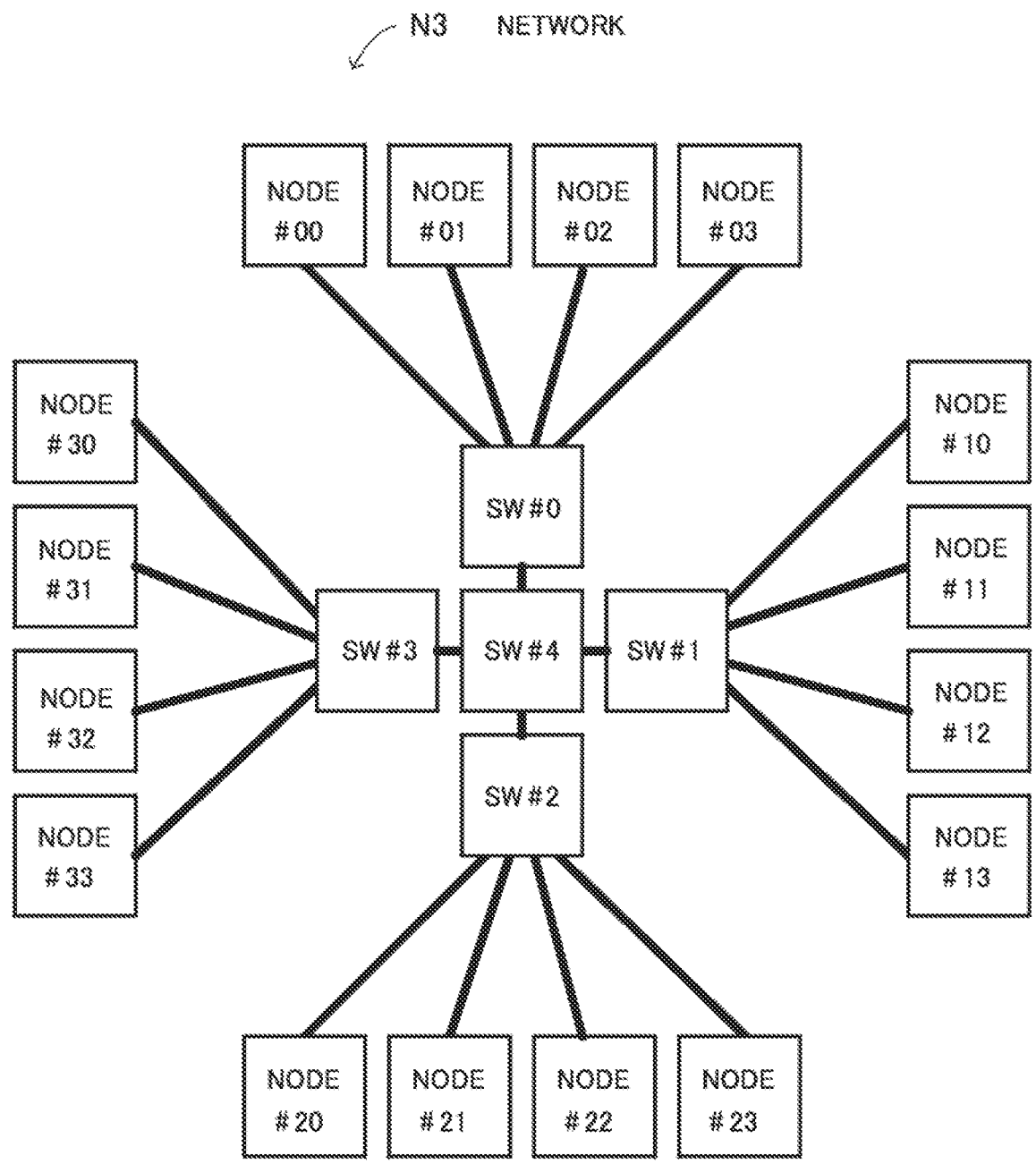
FIG. 4 depicts an example network configuration that uses switches to realize a pseudo two-dimensional torus network.

FIG. 4 depicts an example network configuration that uses switches to realize a pseudo two-dimensional torus network. A network N3 is a network in which a pseudo (virtual) two-dimensional torus network is configured using switches, and includes nodes #00, ..., #03, #10, ..., #13, #20, ..., #23, and #30, ..., #33 and additionally switches SW #0, ..., SW #4.

In the two-dimensional torus network depicted in FIG. 3, although each node would have four ports in a configuration where the nodes are directly interconnected, in the network N3, only one connection port is provided per node and equivalent connections to the four ports are realized virtually via the switches according to time-division. Note that it is also possible to assign a plurality of ports to each node depending on the network bandwidth.

Although Ethernet and Infiniband (registered trademark) are known as methods of connecting nodes, Ethernet, which uses inexpensive equipment, is typically used for networks where nodes are connected via switches. In recent years, research has begun into having computational processing executed by accelerators, which take advantage of FPGAs (Field Programmable Gate Arrays) capable of high-speed parallel computation. Nodes with FPGAs may also be interconnected via a network in the same way as nodes with CPUs.

In a network where nodes are interconnected via Ethernet switches, congestion may occur at a switch that relays packets and it may prevent efficient transmission.

Figure 5:
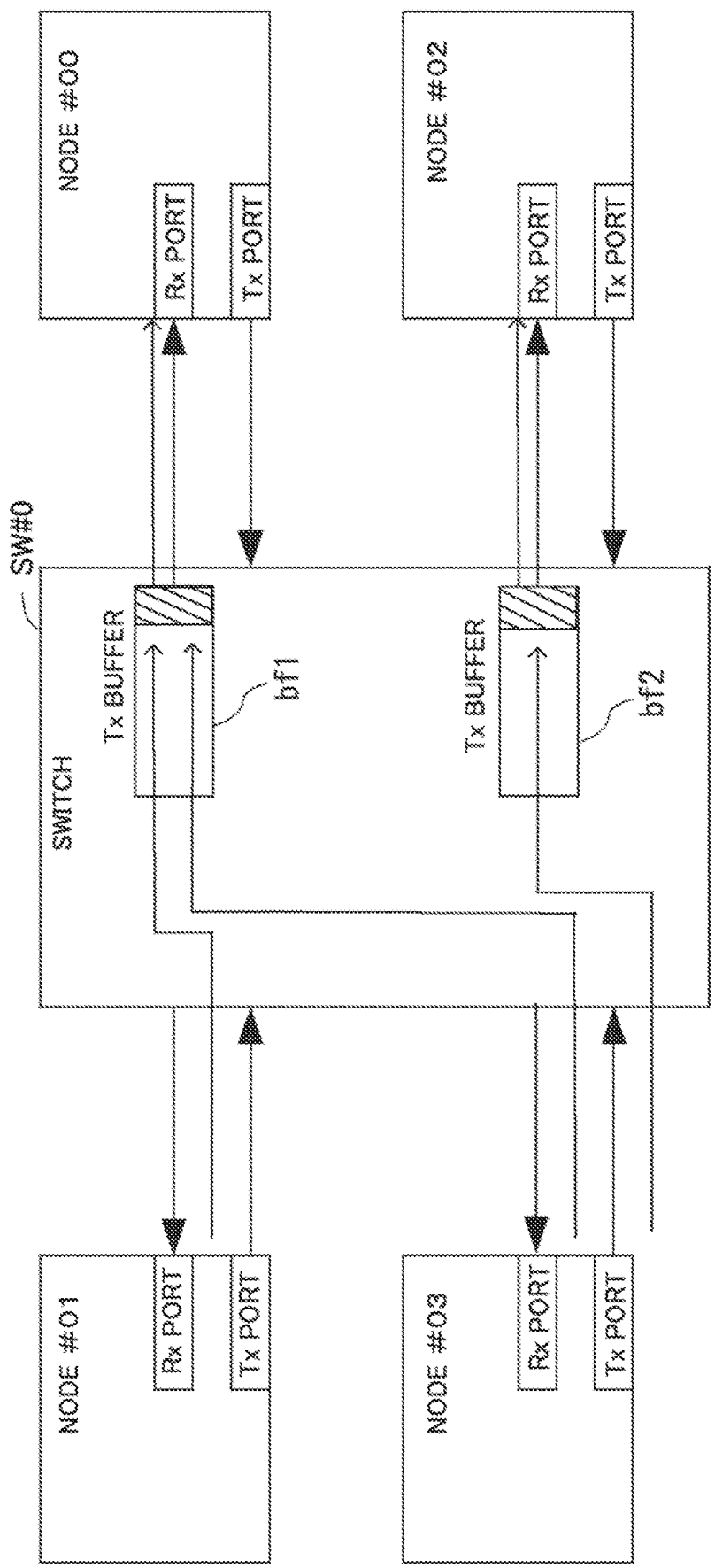
FIG. 5 depicts an example state where congestion has not occurred at a switch.

FIG. 5 depicts an example state where congestion has not occurred at a switch. In this example, the nodes #01, #03, #00, and #02 are connected to the switch SW #0. The nodes #01, #03, #00, and #02 each have an Rx port (that is, a port for receiving packets) and a Tx port (that is, a port for transmitting packets). The switch SW #0 includes Tx buffers bf1 and bf2 for buffering transmission packets.

The Tx buffer bf1 in the switch SW #0 buffers packets transmitted from the nodes #01 and #03. The buffered packets are transmitted to the node #00 and are received at the Rx port of the node #00.

The Tx buffer bf2 in the switch SW #0 buffers packets transmitted from the node #03. The buffered packets are transmitted to the node #02 and are received at the Rx port in the node #02. In the example in FIG. 5, the Tx buffers bf1 and bf2 have not overflowed and congestion is yet to occur.

Figure 6:
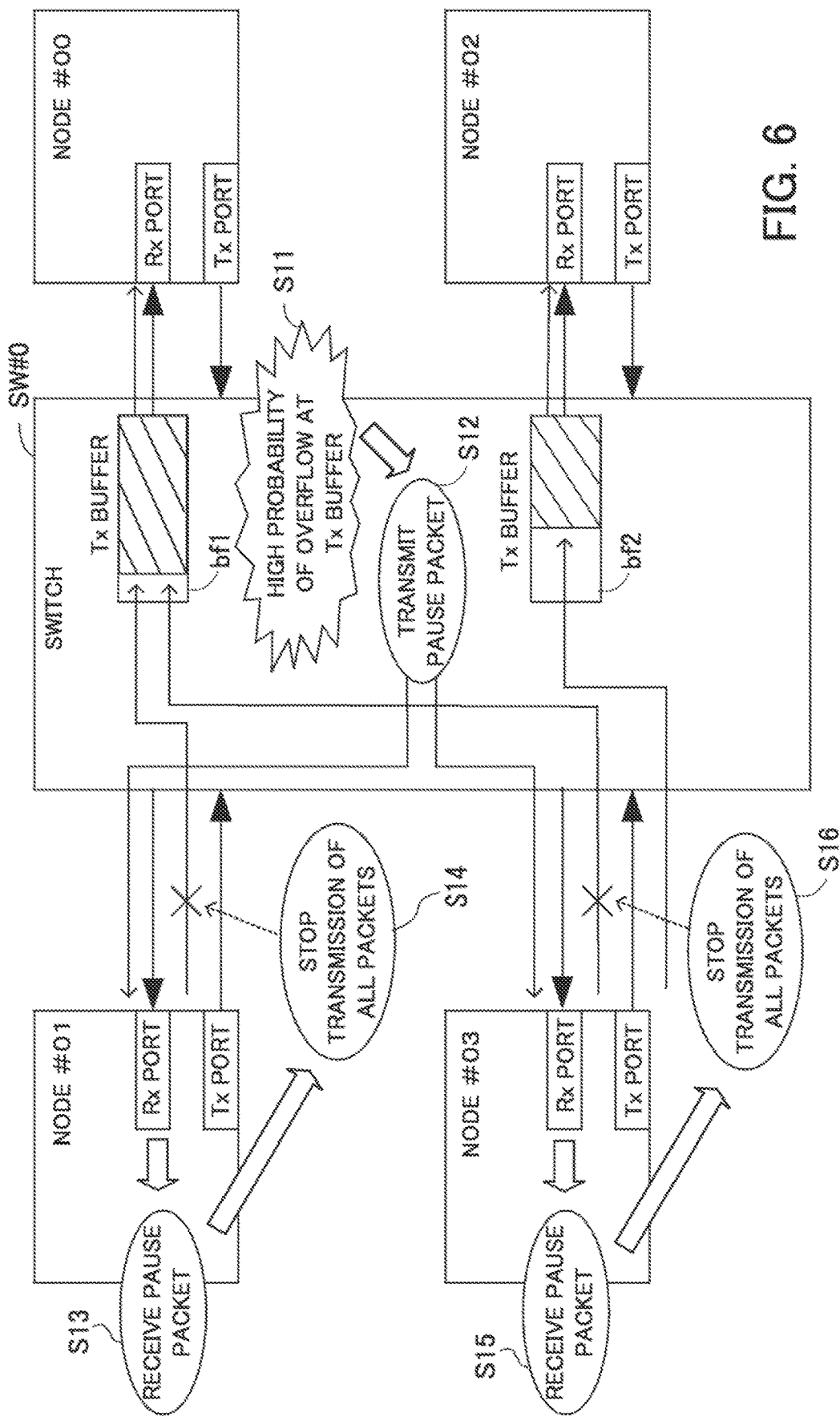
FIG. 6 depicts an example state where packet transmission is stopped by a Pause packet.

FIG. 6 depicts an example state where packet transmission is stopped by a Pause packet.

(Step S11) The Tx buffer bf1 buffers the packets transmitted from the nodes #01 and #03 and is about to overflow.

(Step S12) The switch SW #0 transmits a Pause packet to the nodes #01 and #03.

(Step S13) The node #01 receives the Pause packet at the Rx port.

(Step S14) The node #01 stops the transmission of all packets in keeping with reception of the Pause packet.

(Step S15) The node #03 receives the Pause packet at the Rx port.

(Step S16) The node #03 stops the transmission of all packets in keeping with reception of the Pause packet.

Figure 7:
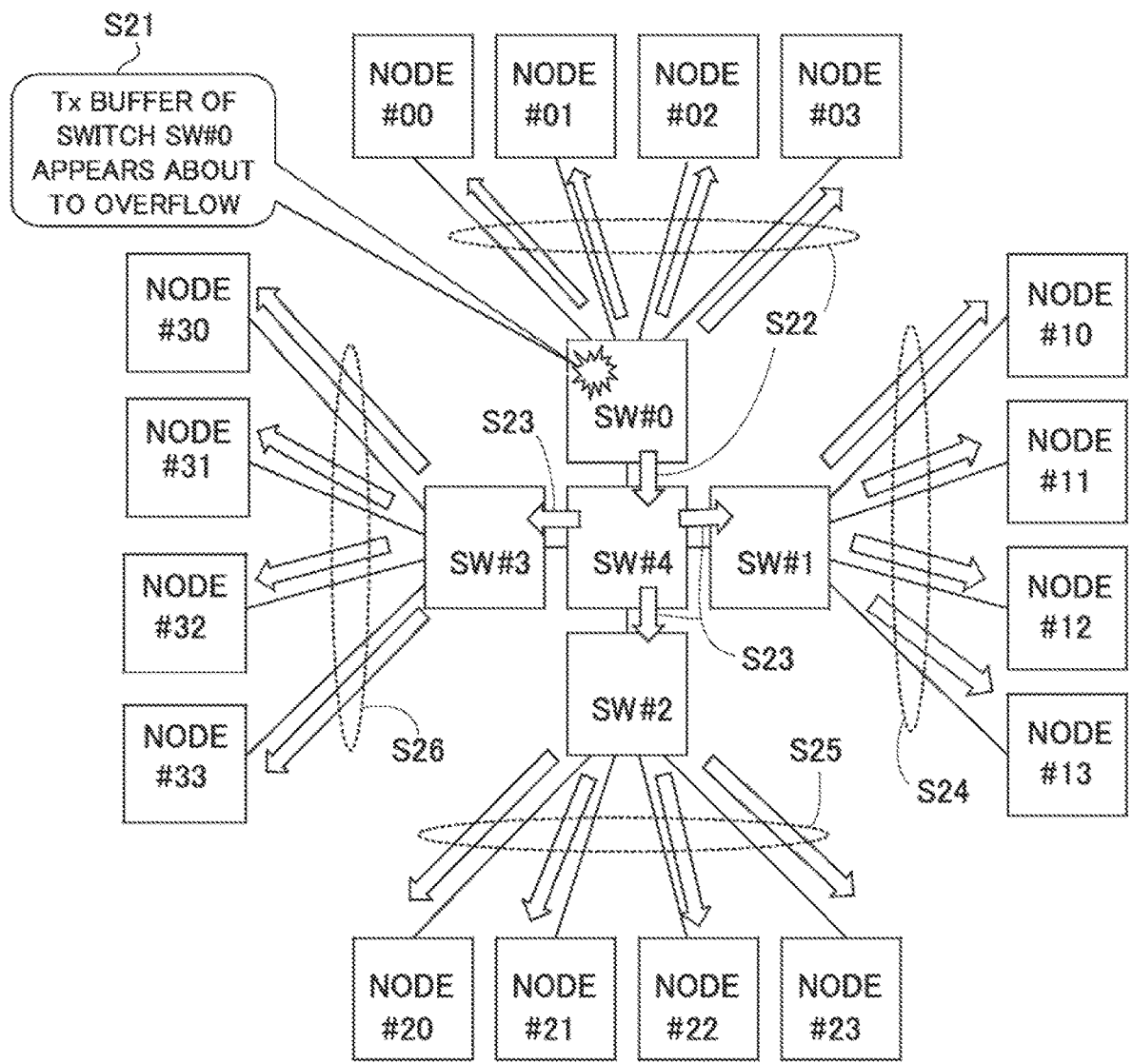
FIG. 7 depicts an example of multicast transmission of a Pause packet.

FIG. 7 depicts an example of multicast transmission of a Pause packet.

(Step S21) The Tx buffer of the switch SW #0 is about to overflow.

(Step S22) The switch SW #0 transmits a Pause packet to the nodes #00, #01, #02, and #03 and the switch SW #4.

(Step S23) The switch SW*4 transmits a Pause packet to the switches SW #1, SW #2, and SW #3.

(Step S24) The switch SW*1 transmits a Pause packet to the nodes #10, #11, #12, and #13.

(Step S25) The switch SW #2 transmits a Pause packet to the nodes #20, #21, #22, and #23.

(Step S26) The switch SW #3 transmits a Pause packet to the nodes #30, #31, #32, and #33.

In this way, when packets are about to overflow at a switch, the switch performs flow control by sending a Pause packet to the transmitter nodes to stop the outputting of packets on the transmitter side. In addition to transmitting the Pause packet, the switch discards the overflowed packets in anticipation of retransmission processing by a higher-level protocol, such as IP (Internet Protocol).

Since the Pause packet generated by the switch is sent as a multicast packet, all of the connected nodes are collectively requested to stop and restart transmission of packets, resulting in packets being stopped across the whole network. In the example in FIG. 7, although only the nodes #01, #03, #10, and #30 are communicating with the node #00, the transmission of the Pause packet to the entire network stops the transmission of packets across the network.

When many nodes are virtually connected by a multidimensional torus network, connections are potentially made via multiple switches, which may explosively increase the number of Pause packets sent by multicasting. As a result, data communication stops even for nodes aside from the node pairs where the bandwidth has been exceeded, which greatly affects the performance of the entire system.

As a method of avoiding the generation of Pause packets, it would be conceivably possible to limit the bandwidth at the switch and implement precise flow control. However, when bandwidth limitations are placed on individual reception ports, there is a high probability that transmission ports will have their bandwidth limited even when there is still unused capacity in the reception bandwidth of a node, which prevents efficient transmission from being performed. High-performance switches are also expensive and since additional control would be performed over the switches, there are concerns that this would complicate the system and increase the price.

On the other hand, since various levels of service quality are present on an inter-node network, there are cases where it is insufficient to merely stop and restart the outputting of frames and more precise control than simply stopping transmission is performed. As one example, during communication between parallel computational circuits implemented on FPGAs, there are cases where it is desirable for communication to continue with a small delay even though the rate is lowered and also cases where communication may stop for a certain period.

The present embodiments were conceived in view of the issues described above, and perform highly efficient congestion control of a network including a switch to avoid congestion while also avoiding a complete stopping of packet transmission by every node due to the use of a Pause packet when there is a sign of data congestion.

Second Embodiment

Next, a second embodiment where the functions of the present embodiment are applied to the nodes constructing an HPC network will be described in detail. Note that in the following description, a node that receives a packet including service data (which corresponds to the node #00 depicted in FIGS. 5 to 7) may be referred to as a "receiver node". Likewise, a node that transmits packets (corresponding to nodes #01 and #03 depicted in FIGS. 5 to 7) via the switch to a receiver node may be referred to as a "transmitter node".

Functional Blocks

Figure 8:
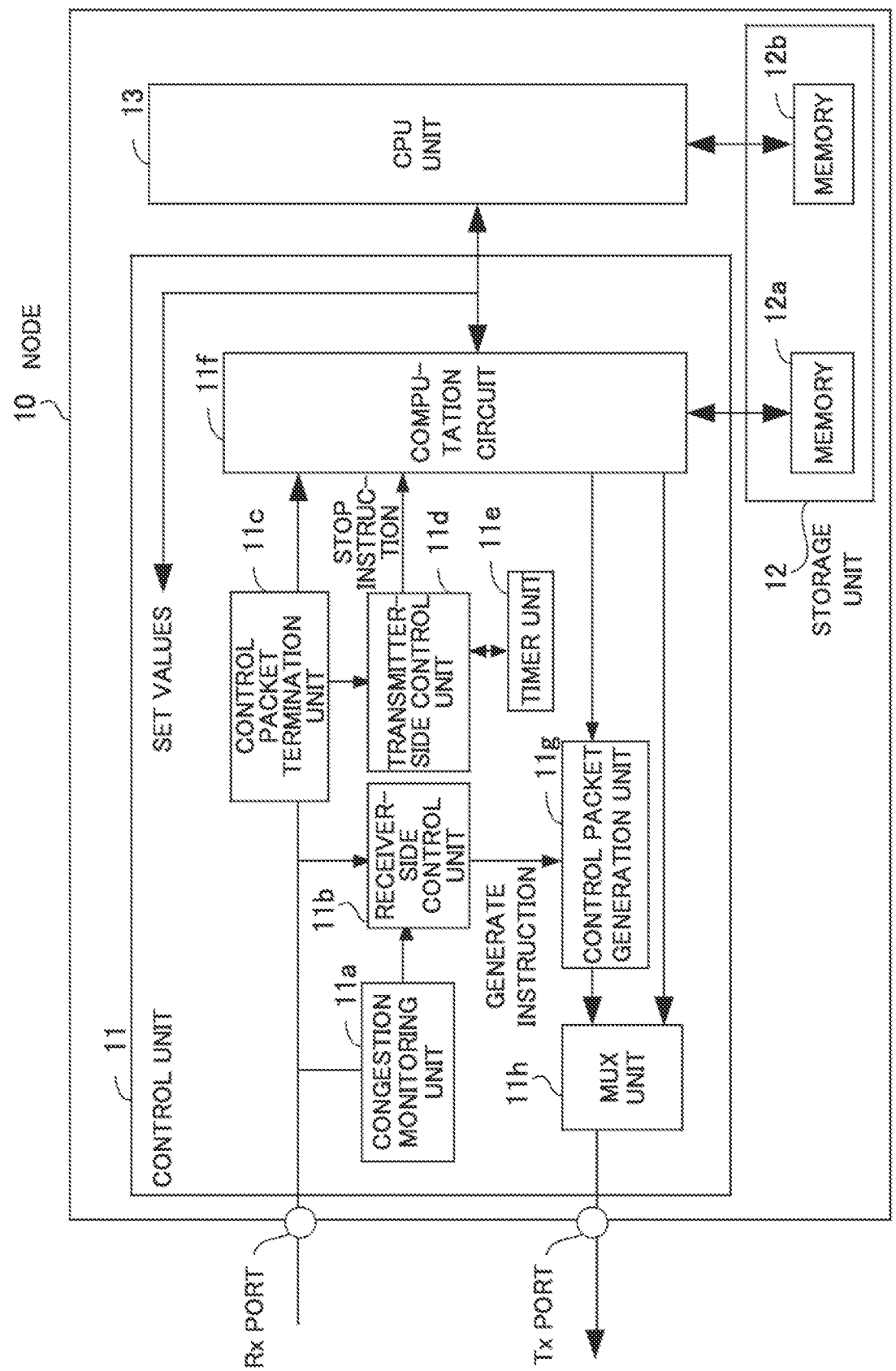
FIG. 8 depicts example functional blocks of a node.

FIG. 8 depicts example functional blocks of a node. A node 10 corresponds to the communication apparatus 1 in FIG. 1, and includes a control unit 11, a storage unit 12, a CPU unit 13, and communication ports (Rx/Tx ports). As one example, the control unit 11 is an FPGA and is central to the operation of the node 10. The CPU unit 13 includes a CPU and peripheral circuits (the functions of the CPU unit 13 may be included in the control unit 11). The node 10 has both the functions of a receiver node and the functions of a transmitter node.

The control unit 11 is connected to the CPU unit 13. The storage unit 12 includes memories 12a and 12b, with the control unit 11 connected to the memory 12a and the CPU unit 13 connected to the memory 12b.

The control unit 11 includes a congestion monitoring unit 11a, a receiver-side control unit 11b, a control packet termination unit 11c, a transmitter-side control unit 11d, a timer unit 11e, a computation circuit 11f, a control packet generation unit 11g, and a MUX unit 11h.

Note that the operations of the timer unit 11e, the transmitter-side control unit 11d, and the receiver-side control unit 11b will be described in detail later. The various set values communicated by the computation circuit 11f and the CPU unit 13 will also be described later.

The congestion monitoring unit 11a monitors the reception frequency of received packets to monitor congestion at the Tx buffer in the switch SW. That is, the congestion monitoring unit 11a has an internal timer for monitoring congestion. The control packet termination unit 11c receives control packets requesting a transmission stop or a cancelling of a transmission stop and performs termination processing.

The computation circuit 11f performs computational processing related to stopping packet transmission, lowering the packet transmission rate, generating packets according to priority, and the like. The control packet generation unit 11g generates a control packet for a transmission stop request and a control packet for a transmission stop cancelling request. The MUX unit 11h performs multiplexing processing for control packets and computation data.

Operation of Timer Unit

The timer unit 11e has a transmission stop timer for each link destination (that is, each node that exchanges data with the present node). When a control packet for a transmission stop request is received, the following values are set in the timer according to the settings.

A timer value recorded in a control packet for a transmission stop request

A timer value for each link destination set in advance from the CPU unit 13

Note that which of these values is to be used is decided as follows. When a setting from the CPU unit 13 or the timer value in the control packet is 0, a timer value set in advance from the CPU unit 13 is used.

The timer sequentially counts down, stops on reaching zero, and the transmitter-side control unit 11d is notified of the expiration of the timer. When a control packet for a transmission stop request is newly received during the counting down of the timer, the timer value is reset (that is, the timer value is extended) and the counting down continues.

Operation of Transmitter-Side Control Unit

The transmitter-side control unit 11d receives information, such as information identifying the transmitter of a received control packet, a packet type, a priority, a timer value, and a transmission rate value, from the control packet termination unit 11c. In addition, depending on the type of received packet, the timer unit 11e is given a start, stop, or extend (update timer value) instruction.

In addition, the transmitter-side control unit 11d manages the transmission control status for each link destination as described below in keeping with the type of control packet that has been received.

During a packet stop (lowered rate) state, the transmission stop cancelled state is set when a control packet for a transmission stop cancelling request is received or when a timer expires. Since a packet stop may be regarded as one type of lowered rate, both are treated as the same status.

During the transmission stop cancelled state for packets, the packet stop (lowered rate) state is set when a control packet for a transmission stop request is received.

When the control status changes to the packet stop state, the transmitter-side control unit 11d instructs the computation circuit 11f to stop transmitting packets (or lower the rate) to the link destination. When a priority has been specified, notification of the priority is given at the same time.

When the control status changes to the packet stop cancelled state, the computation circuit 11f is instructed to restart packet transmission (or restore the rate) to the link destination. After this, on being notified by the timer unit 11e that the timer has expired, the computation circuit 11f is instructed to restart packet transmission (or restore the rate) to the link destination.

Operation of Receiver-Side Control Unit

The receiver-side control unit 11b receives detection information for congestion for each link destination from the congestion monitoring unit 11a and manages the reception control status for each link destination as follows.

When, in the packet stop (lowered rate) state, disappearance of the sign of congestion has been detected, the packet stop cancelled state is set. Since a packet stop may be regarded as one type of lowered rate, both are treated as the same status. When, in the packet stop cancelled state, a sign of congestion is detected, the packet stop (lowered rate) state is set.

On the other hand, when the control status has changed to the packet stop state, the receiver-side control unit 11b instructs the control packet generation unit 11g to generate a control packet for a transmission stop request for the link destination. In addition, when the control status has changed to the packet stop cancelled state, the control packet generation unit 11g is instructed to generate a control packet for a transmission stop cancelling request for the link destination.

Specific Examples of Set Values

Figure 9:
FIG. 9 depicts specific examples of set values.

FIGS. 9 and 10 depict specific examples of set values. Tables T1 and T2 depict settings and examples of their set values. The content of each setting in the table T1 is described below.

The set value of the link destination MAC (Media Access Control) address indicated as the setting a1 is 48 bytes. This is the MAC addresses of nodes that transmit packets to the present node, and has a number of set values in keeping with the size of the network, for example, set values for 32 nodes.

The priority in a control packet for a transmission stop request indicated as the setting a2 has a set value in a range of 0 to 16. The priority included in a control packet for a transmission stop request is set for each setting of the link destination MAC address.

The timer value of a control packet for a transmission stop request indicated as the setting a3 has a set value in a range of 0 to 255. The timer value included in a control packet for a transmission stop request is set for each setting of the link destination MAC address.

Transmission rate lowering information of a control packet for a transmission stop request indicated as the setting a4 has a set value in a range of 0 to 10. The transmission rate lowering information included in a control packet for a transmission stop request is set for each setting of the link destination MAC address. As one example, the rate is reduced to the set value ×10%.

The (overall) priority at reception of a control packet for a transmission stop request indicated as the setting a5 has a set value in a range of 0 to 16. A default priority to be used is set in this value. As one example, when the priority setting of a control packet for a transmission stop request that has been received is 0, the priority of the packets to be stopped is determined according to this set value.

The (link destination) priority at reception of a control packet for a transmission stop request indicated as the setting a6 has a set value in a range of 0 to 16. A default priority is set for each setting of the link destination MAC address. As one example, when the priority setting of a control packet for a transmission stop request that has been received is 0, the priority of the packets to be stopped is determined according to this set value. That is, it is possible to use one priority setting for the whole system and also possible to have individual priority settings for each link destination.

Next, the content of each setting in the table T2 will be described below.

The valid data region indicated as the setting b1 is divided into the settings b1-1 and b1-2. In the setting b1-1, the monitoring cycle (when detecting a sign of congestion) is 1 ps, the congestion sign detection threshold is 10000 bytes, and the number of protective steps (when detecting a sign of congestion) is 3. Accordingly, for this example of the setting b1-1, when a state where the valid data region has 10000 bytes or more in 1 ps occurs three times consecutively, it is determined that there is a sign of congestion.

In the setting b1-2, the monitoring cycle (for disappearance of the sign of congestion) is 1 ps, the congestion sign disappearance threshold is 5000 bytes, and the number of protective steps (for disappearance of the sign of congestion) is 5. Accordingly, for this example of the setting b1-2, when a state where the valid data region has less than 5000 bytes in 1 ps occurs five times consecutively, it is determined that the sign of congestion has disappeared.

The packet interval indicated as the setting b2 is divided into the settings b2-1 and b2-2. In the setting b2-1, the monitoring cycle (when detecting a sign of congestion) is 1 ps, and the congestion sign detection threshold is 5 bytes. Accordingly, for this example of the setting b2-1, when a state where the packet interval is 5 bytes or less continues for 1 ps or longer, it is determined that there is a sign of congestion.

In the setting b2-2, the monitoring cycle (for disappearance of the sign of congestion) is 3 μs, and the congestion sign disappearance threshold is 13 bytes. Accordingly, for this example of the setting b2-2, when a state where the packet interval is 13 bytes or more continues for 3 μs or longer, it is determined that the sign of congestion has been disappeared.

The delimiter indicated as the setting b3 is divided into the settings b3-1 and b3-2. In the setting b3-1, the monitoring cycle (when detecting a sign of congestion) is 1 μs, and the congestion sign detection threshold is 4 octets. Accordingly, for this example of the setting b3-1, when preambles with 4 octets or less continuously occur for 1 μs or longer, it is determined that there is a sign of congestion.

In the setting b3-2, the monitoring cycle (for disappearance of the sign of congestion) is 2 μs and the congestion sign disappearance threshold is 8 octets. Accordingly, for this example of the setting b3-2, when preambles with 8 octets or less continuously occur for 2 μs or longer, it is determined that the sign of congestion has been disappeared.

Hardware

Figure 11:
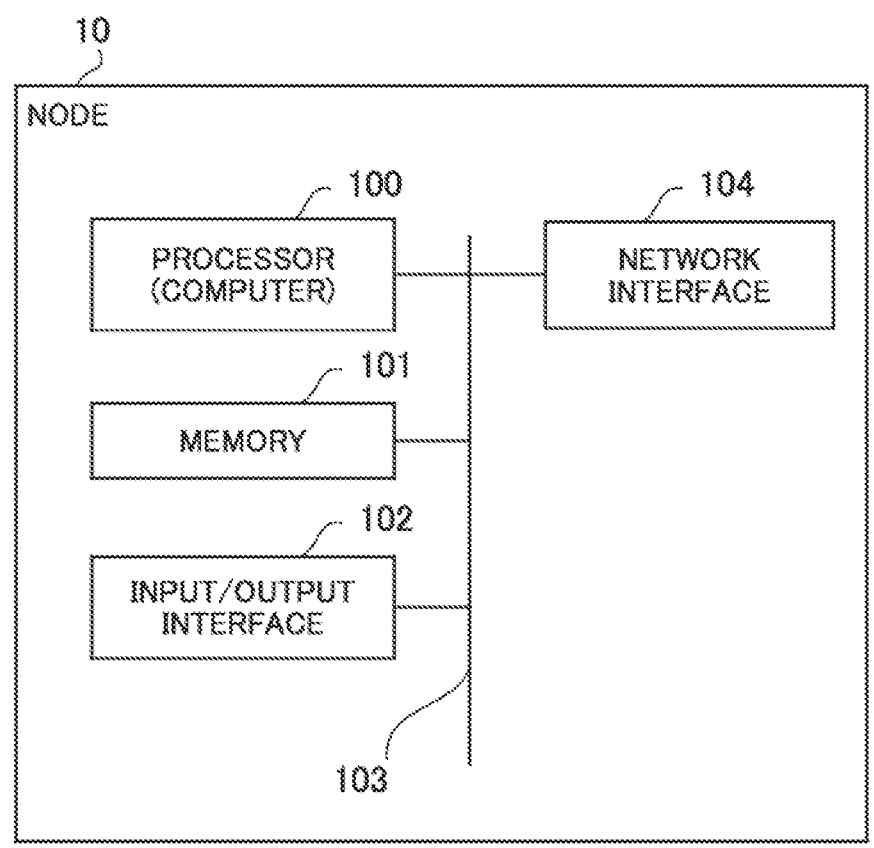
FIG. 11 depicts an example hardware configuration of a node.

FIG. 11 depicts an example hardware configuration of a node. The node 10 is subject to overall control by a processor (computer) 100. The processor 100 realizes the functions of the control unit 11.

A memory 101, an input/output interface 102, and a network interface 104 are connected via a bus 103 to the processor 100.

The processor 100 may be a multiprocessor. As examples, the processor 100 is a CPU, an FPGA, an MPU (Micro Processing Unit), a DSP (Digital Signal Processor), an ASIC (Application Specific Integrated Circuit), or a PLD (Programmable Logic Device). The processor 100 may also be a combination of two or more elements out of a CPU, an FPGA, an MPU, a DSP, an ASIC, and a PLD.

The memory 101 realizes the functions of the storage unit 12 and is used as the main storage apparatus of the node 10. At least part of an OS (Operating System) program and/or an application program to be executed by the processor 100 are temporarily stored in the memory 101. The memory 101 also stores various data used in processing by the processor 100.

The memory 101 is also used as an auxiliary storage apparatus of the node 10, and stores an OS program, an application program, and various data. As this auxiliary storage apparatus, the memory 101 may include a semiconductor storage apparatus, such as flash memory or an SSD (Solid State Drive), or a magnetic recording medium, such as an HDD (Hard Disk Drive).

Peripherals connected to the bus 103 include the input/output interface 102 and the network interface 104. The input/output interface 102 is connectable to an information inputting apparatus, such as a keyboard or a mouse, and transmits signals sent from the information inputting apparatus to the processor 100.

The input/output interface 102 also functions as a communication interface for connecting peripherals. As one example, the input/output interface 102 connects an optical drive apparatus that uses a laser beam or the like to read data recorded on an optical disc. Optical discs include Blu-ray Discs (registered trademark), CD-ROM (Compact Disc-Read Only Memory), and CD-R (Recordable)/RW (Rewritable).

The input/output interface 102 also connects to a memory apparatus and/or a memory reader/writer. The memory apparatus is a recording medium equipped with a function for communicating with the input/output interface 102. A memory reader/writer is an apparatus that writes data onto or reads data from a memory card. A memory card is a card-type recording medium.

The network interface 104 connects to the network and performs network interface control. As examples of the network interface 104, an NIC (Network Interface Card) or a wireless LAN (Local Area Network) card may be used. The data received by the network interface 104 is outputted to the memory 101 and/or the processor 100.

The processing functions of the node 10 are realized by the hardware configuration described above. As one example, the node 10 performs the processing of the present embodiment by having the processor 100 execute predetermined programs.

As one example, the node 10 realizes the processing functions of the present embodiment by executing a program recorded on a computer-readable recording medium. A program in which the processing content to be executed by the node 10 is written may be recorded in advance on various recording media.

As one example, a program to be executed by the node 10 may be stored in advance in the auxiliary storage apparatus. The processor 100 loads at least part of the program in the auxiliary storage apparatus into the main storage apparatus and executes the program.

It is also possible to record the program on a portable recording medium, such as an optical disc, a memory apparatus, or a memory card. As one example, the program stored on the portable recording medium is installed into the auxiliary storage apparatus under the control of the processor 100 and then becomes executable. It is also possible for the processor 100 to read and execute the program directly from a portable recording medium.

Format of Control Packet

Figure 12:
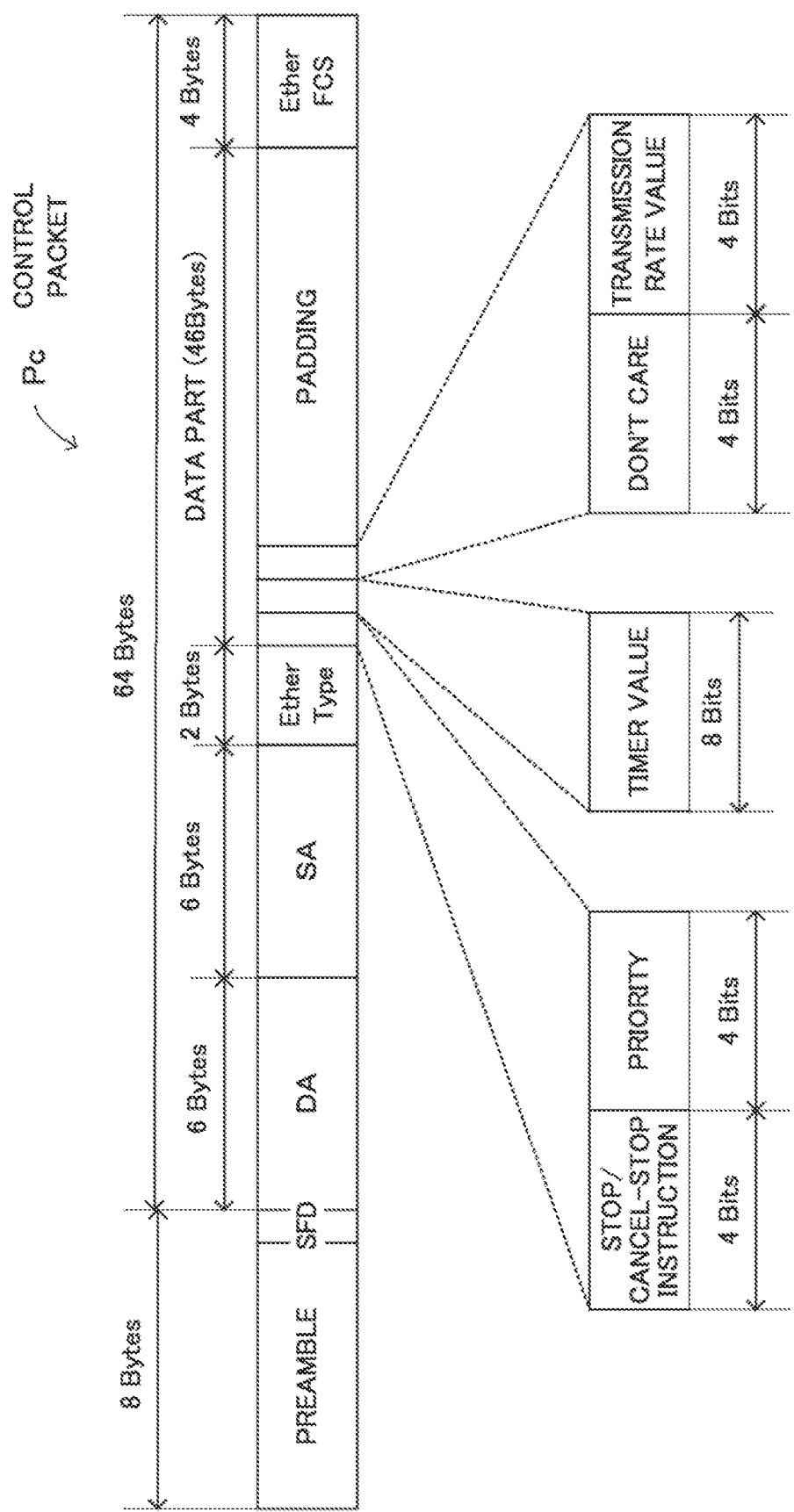
FIG. 12 depicts one example format of a control packet.

FIG. 12 depicts one example format of a control packet. A control packet Pc for a transmission stop request/transmission stop cancelling request includes the following fields: a preamble; an SFD (Start Frame Delimiter), a DA (Destination Address), an SA (Source Address), an Ether Type, a data part, and an Ether FCS (Frame Check Sequence).

The preamble is 7 bytes and the SFD is 1 byte. The DA is 6 bytes, the SA is 6 bytes, the Ether Type is 2 bytes, the data part is 46 bytes, and the Ether FCS is 4 bytes. Note that a value aside from "Reserved" (as examples, 0xFF10 to 0xFFFE) is defined in the Ether Type.

The data part includes the following fields in order from the start: stop/cancel-stop instruction; priority; timer value; "Don't Care"; and transmission rate value (transmission rate lowering information). The remaining fields are padded (that is, all "0").

The stop/cancel stop instruction is 4 bits, where 0x0 is a transmission stop and 0xF is a transmission stop cancellation. The priority is 4 bits, and a value from 0x0 to 0xF is specified as the priority for nodes subjected to a transmission stop. The timer value is 8 bits, and a value from 0x00 to 0xFF is specified as the transmission stop time.

"Don't Care" is 4 bits. The transmission rate value is also 4 bits. As one example, 0x0 specifies a transmission stop, 0x1 specifies a transmission rate of $1/16$, 0x2 specifies a transmission rate of $2/16$, 0x3 specifies a transmission rate of $3/16$, and 0xF specifies a transmission rate of $15/16$.

Transmission Stop by a Transmission Stop Request Control Packet (Without Priority)

Figure 13:
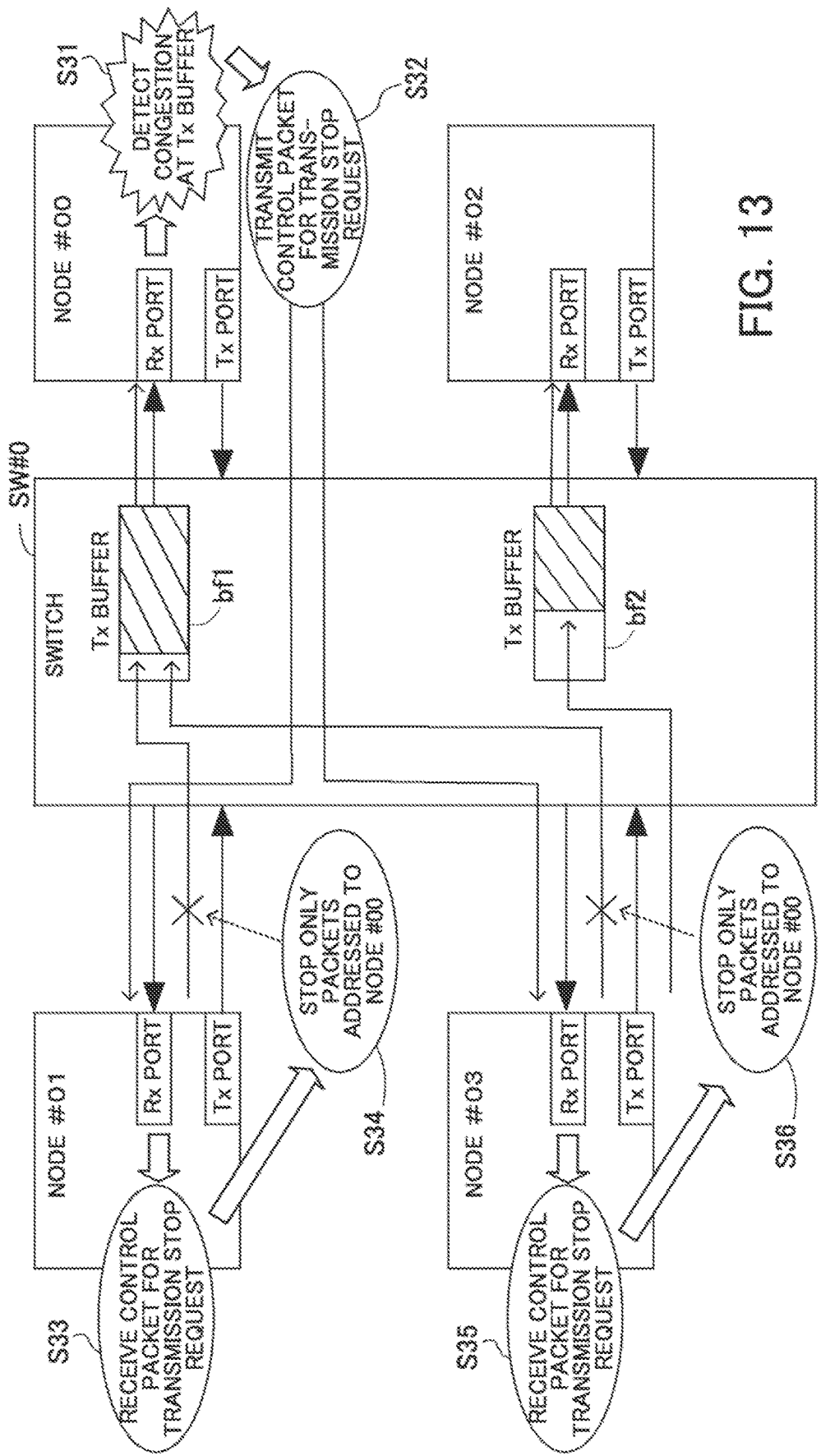
FIG. 13 depicts one example of a transmission stop without priority by a control packet for a transmission stop request.

FIG. 13 depicts one example of a transmission stop without priority by a control packet for a transmission stop request.

(Step S31) The node #00 detects a sign of congestion at the Tx buffer bf1 in the switch SW #0.

(Step S32) When a sign of congestion has been detected at the switch SW #0, the node #00 outputs a control packet for a transmission stop request. Note that the transmission destination of the control packet is nodes that are transmitting packets to the receiver node. In this example, since the nodes transmitting packets to the node #00 are the nodes #01 and #03, the control packet is transmitted to the nodes #01 and #03.

It is determined that the nodes transmitting packets to the node #00 are the nodes #01 and #03 based on transmitter addresses included in the packets received at the node #00 or on transmitter addresses that have been set in advance.

(Step S33) The node #01 receives the control packet for a transmission stop request.

(Step S34) The node #01 completely stops transmitting only packets addressed to the node #00.

(Step S35) The node #03 receives a control packet for a transmission stop request.

(Step S36) The node #03 completely stops transmitting only packets addressed to the node #00.

Transmission Stop by a Transmission Stop Request Control Packet (with Priority)

Figure 14:
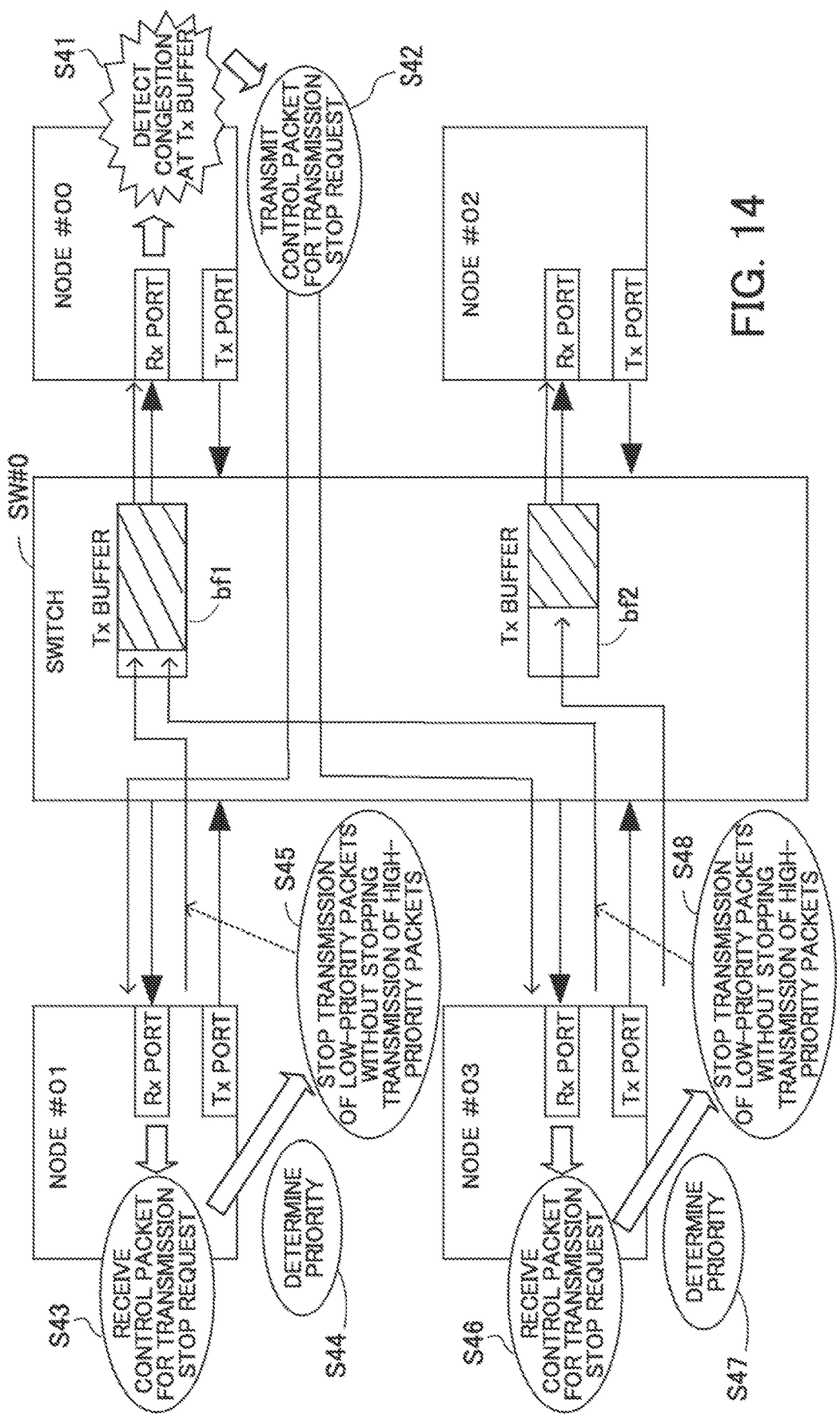
FIG. 14 depicts one example of a transmission stop with priority by a control packet for a transmission stop request.

FIG. 14 depicts one example of a transmission stop with priority by a control packet for a transmission stop request.

(Step S41) The node #00 detects a sign of congestion at the Tx buffer bf1 in the switch SW #0.

(Step S42) When a sign of congestion has been detected at the switch SW #0, the node #00 outputs a control packet for a transmission stop request to the nodes #01 and #03.

(Step S43) The node #01 receives the control packet for a transmission stop request.

(Step S44) The node #01 determines the priority.

(Step S45) Based on the determination of the priority, the node #01 transmits high-priority packets to the node #00 but stops the transmission of low-priority packets.

(Step S46) The node #03 receives the control packet for a transmission stop request.

(Step S47) The node #03 determines the priority.

(Step S48) Based on the determination of the priority, the node #03 transmits high-priority packets to the node #00 but stops the transmission of low-priority packets.

Here, when performing transmission stop control using priority, the nodes #01 and #03 may perform control as described in (1a) to (3a) below.

(1a) When the nodes #01 and #03 have received a control packet for a transmission stop request, high-priority packets are transmitted and transmission of low-priority packets is stopped according to the priorities that have been set in advance for each node.

(2a) When the nodes #01 and #03 have received a control packet for a transmission stop request, high-priority packets are transmitted and transmission of low-priority packets is stopped according to the priority set in the control packet.

(3a) When the nodes #01 and #03 have received a control packet for a transmission stop request, transmission of packets is stopped in keeping with a priority ranking set in advance for each node.

Specific Example of Priority

In the example format of a control packet depicted in FIG. 12, 4 bits (that is, 16 levels) may be set as the priority. The priority is set by an application in the control unit 11 (in hardware terms, the computation circuit 11f).

The control unit 11 sets the highest priority for communication for which continuation is desirable with a small delay even though the rate is lowered, and sets the lowest priority for communication that may be stopped for a certain period. When a control packet for a transmission stop request has been received at the Rx port, the control unit 11 stops the transmission of packets with a lower (smaller) priority than the priority included in the control packet. When the priority in the received control packet for a transmission stop request is 0, the control unit 11 stops the transmission of packets with a lower (smaller) priority than a priority set in advance.

Note that the priority may be set so that a single priority is used for every link destination or may be set so that a separate set value is provided for each link destination.

It is also possible to perform control based on four levels of priority by using the upper two bits of the priority value as selection information for which set values to use. As one example, "00" may indicate the use of the same priority setting for every link destination, "01" may indicate individual priority values for each node, "10" may indicate the priority included in the packet, and "11" may indicate a stop to all transmission regardless of priority.

Lowering of Transmission Rate by Control Packet for a Transmission Stop Request

Figure 15:
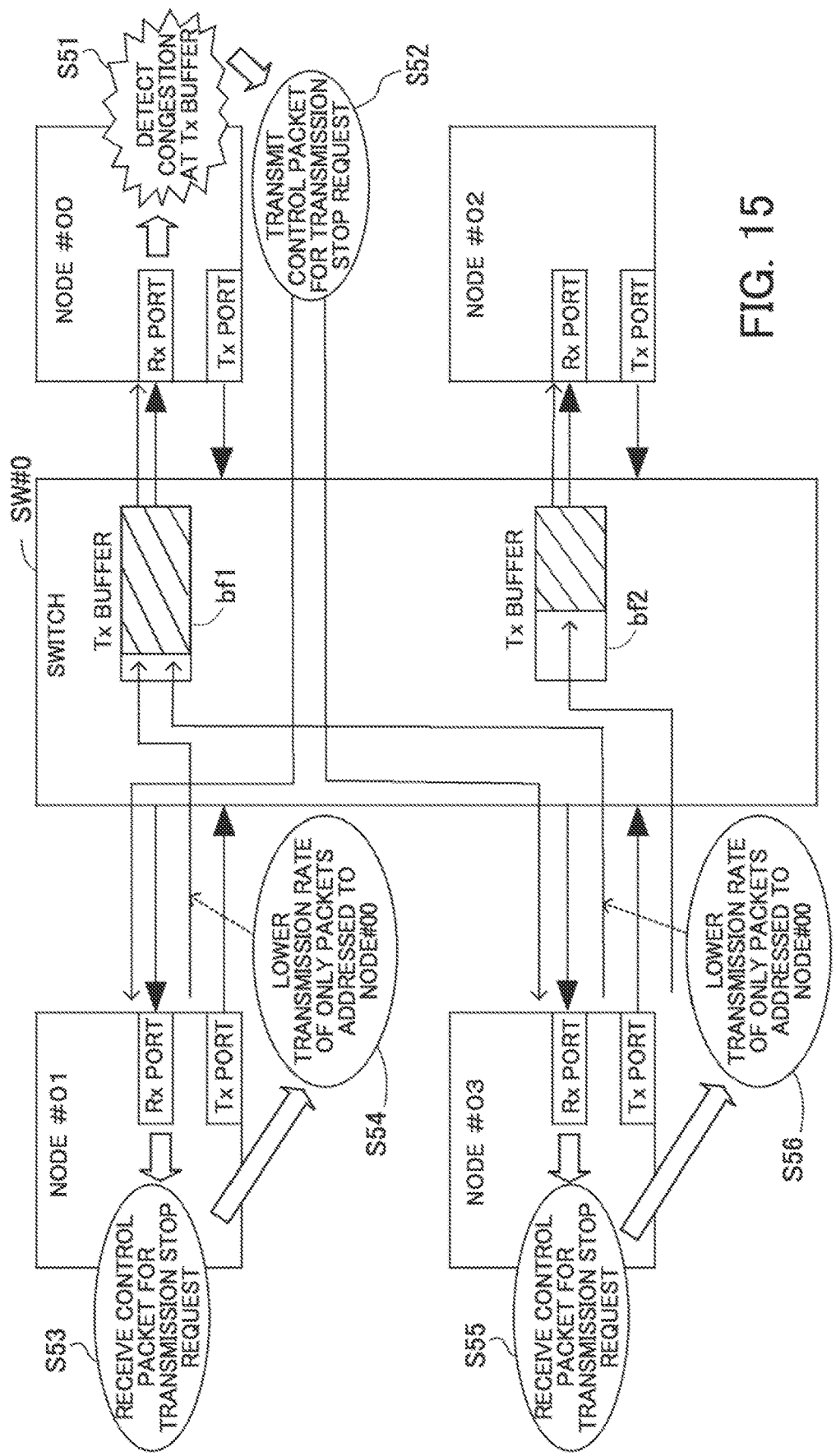
FIG. 15 depicts an example of a lowering of the transmission rate by a control packet for a transmission stop request.

FIG. 15 depicts an example of a lowering of the transmission rate by a control packet for a transmission stop request.

(Step S51) The node #00 detects a sign of congestion at the Tx buffer bf1 in the switch SW #0.

(Step S52) When a sign of congestion has been detected at the switch SW #0, the node #00 outputs a control packet for a transmission stop request to the nodes #01 and #03.

(Step S53) The node #01 receives the control packet for a transmission stop request.

(Step S54) In response to reception of the control packet transmitted from the node #00, the node #01 lowers the transmission rate of only packets addressed to the node #00.

(Step S55) The node #03 receives the control packet for a transmission stop request.

(Step S56) In response to reception of the control packet transmitted from the node #00, the node #03 lowers the transmission rate of only packets addressed to the node #00.

In this way, at the nodes #01 and #03 that have received the control packet for a transmission stop request, instead of completely stopping the outputting of packets, the packet transmission rate is lowered according to a setting to protect the communication of data for which continuation with a small delay is desired.

When lowering the packet transmission rate, the nodes #01 and #03 may perform control like that described in (1b) to (3b) below.

(1b) The nodes #01 and #03 determine the extent to which the packet transmission rate is to be lowered using the transmission rate lowering information set in the control packet.

(2b) The nodes #01 and #03 decide the transmission rate using a function f(n,r) where the value n is the transmission rate lowering information set in the control packet and the value r is the transmission rate before the lowering.

(3b) The nodes #01 and #03 lower the transmission rate to $1/2^n$ of the transmission rate before the lowering using an integer value n which is the transmission rate lowering information set in the control packet.

Specific Examples of Transmission Rate Lowering Information

In the example format of a control packet depicted in FIG. 12, 4 bits may be set as the transmission rate. When a control packet for a transmission stop request is received at the Rx port, the control unit 11 lowers the generation rate of transmission packets in accordance with a transmission rate value (the "transmission rate lowering information") included in the control packet.

Here, when the transmission rate value is n, the rate is lowered to n/16. As examples, "0000" indicates a complete stop, "0001" indicates a rate of $1/16$, "0010" indicates a rate of $2/16$, ..., and "1111" indicates a rate of $15/16$.

When a control packet for a transmission stop request is newly received in the transmission rate lowered state, the control unit 11 lowers the generation rate for transmission packets in accordance with the new transmission rate value included in the control packet.

Here, the control unit 11 lowers the transmission rate using a function f(n,r) where the value n is the transmission rate value included in the new control packet for a transmission stop request and the value r is the transmission rate before reception of the new control packet. As one example, when f(n,r)=n+r−8, the previous transmission rate was "1111" (=$15/16$), and the received transmission rate value is "0111", the new transmission rate is "1110" (=$14/16$).

Alternatively, the control unit 11 lowers the transmission rate to $r/2^n$, where n is the transmission rate value included in the new control packet for a transmission stop request and r is the transmission rate before reception of the new control packet. As one example, when the previous transmission rate was 50% and the received transmission rate value is "0010" (=2), the new transmission rate is 12.5% (=50%×¼).

Note that the control packets for a transmission stop request described above are processed as normal Ethernet packets from the viewpoint of switches connected to an Ethernet, with switches that relay the packets handling the packets as normal communication packets transferred between nodes.

A control packet for a transmission stop request may also include a timer value indicating a transmission stop period. By including a timer value, it becomes possible to carry out precise flow control, such as individually controlling the transmission stop period for each transmitter. In addition, it becomes possible to restart the outputting of packets from a transmitter node even when a control packet for a transmission stop cancelling request does not reach the transmitter node due to an error or another reason.

Although packet outputting control based on reception of a control packet for a transmission stop request has been described above with reference to FIGS. 13 to 15, the operation when the control packet for a transmission stop request is received is limited to packets addressed to the node that transmitted the control packet for the transmission stop request. The operation when a control packet for a transmission stop request has been received may be a combination of the various methods described above depending on the desired quality for the communication between the nodes.

Figure 16:
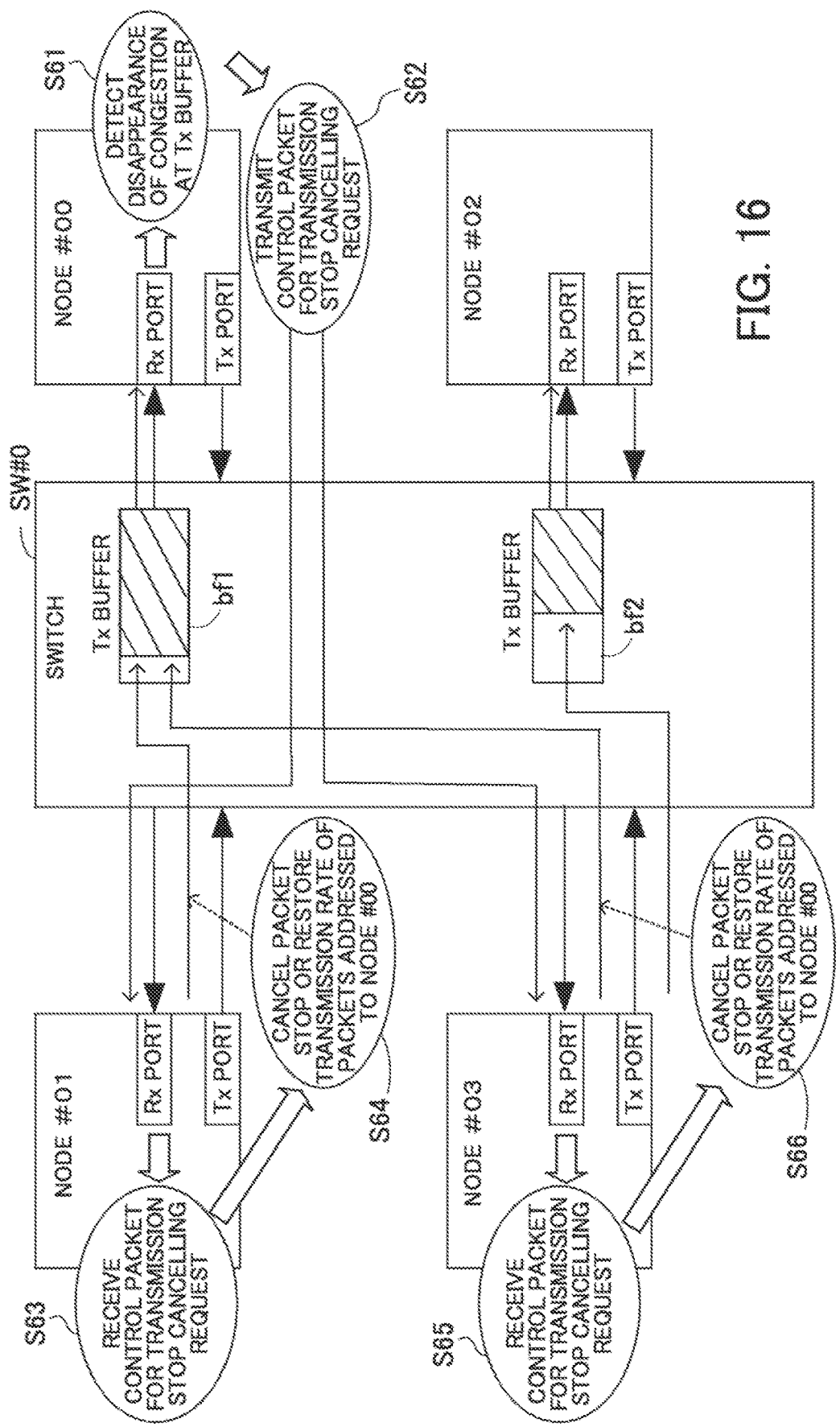
FIG. 16 depicts an example of cancelling of a transmission stop by a control packet for a transmission stop cancelling request.

Cancelling of Transmission Stop by a Control Packet for a Transmission Stop Cancelling Request FIG. 16 depicts an example of cancelling of a transmission stop by a control packet for a transmission stop cancelling request.

(Step S61) The node #00 detects that the sign of congestion at the Tx buffer bf1 in the switch SW #0 has disappeared.

(Step S62) On detecting that the sign of congestion at the switch SW #0 has disappeared, the node #00 outputs a control packet for a transmission stop cancelling request. Note that the transmission destinations of this control packet are nodes that are transmitting packets to the receiver node, and in this example, the control packet is transmitted to the nodes #01 and #03.

Note that a control packet for a transmission stop cancelling request is transmitted by only a node that has already transmitted a control packet for a transmission stop request. Also, the destinations of a control packet for a transmission stop cancelling request are the same as the control packet for the transmission stop request.

(Step S63) The node #01 receives the control packet for a transmission stop cancelling request.

(Step S64) When the node #01 has stopped the transmission of packets addressed to the node #00, the node #01 cancels this stopping of transmission of packets addressed to the node #00. Alternatively, when the transmission rate of packets addressed to the node #00 has been lowered, the transmission rate of packets addressed to the node #00 is restored.

(Step S65) The node #03 receives the control packet for a transmission stop cancelling request.

(Step S66) When the node #03 has stopped the transmission of packets addressed to the node #00, the node #03 cancels this stopping of transmission of packets addressed to the node #00. Alternatively, when the transmission rate of packets addressed to the node #00 has been lowered, the transmission rate of packets addressed to the node #00 is restored.

In this way, at the nodes #01 and #03 that received the control packet for a transmission stop cancelling request, the transmission of packets is restarted in cases where the outputting of packets was stopped and the transmission rate of packets is returned to the rate before lowering in cases where packets were outputted at a lowered rate.

Here, when cancelling a packet transmission stop, the nodes #01 and #03 may perform control like that described in (1c) and (2c) below.

(1c) When a transmission stop period is specified in the control packet for a transmission stop request, the nodes #01 and #03 that have stopped the outputting of packets restart the transmission of packets when the specified stop period has elapsed, even when a control packet for a transmission stop cancelling request has not been received.

(2c) When a transmission stop period is specified in the control packet for a transmission stop request, the nodes #01 and #03 that have lowered the transmission rate of packets restore the transmission rate of packets to the rate before the lowering when the specified stop period has elapsed, even when a control packet for a transmission stop cancelling request has not been received.

Note that control packets for a transmission stop cancelling request are processed as normal Ethernet packets from the viewpoint of switches connected to an Ethernet, with switches that relay the packets handling the packets as normal communication packets transferred between nodes.

Detection of Sign of Congestion

Figure 17:
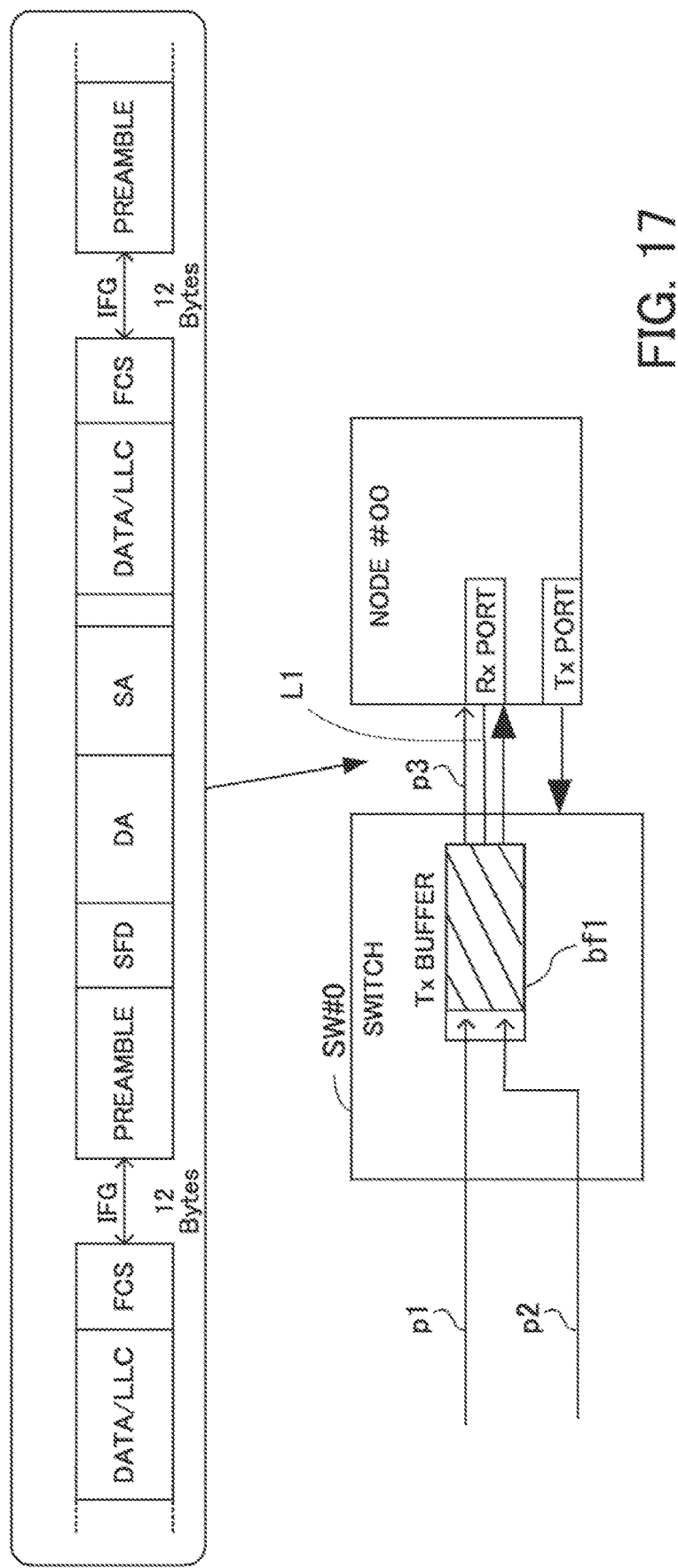
FIG. 17 depicts an example of detection of a sign of congestion.

FIG. 17 depicts an example of detection of a sign of congestion. It is assumed here that packets (packet streams) p1 and p2 are inputted into the switch SW #0 and buffered in the Tx buffer bf1, and the buffered packets (packet stream) p3 are then transmitted to the node #00 via a communication line L1.

By monitoring the rate of received packets at the node #00, it is determined that there is a sign of congestion at the Tx buffer bf1 in the switch SW #0. In the example in FIG. 17, when the sum of the amount of data in the packet p1 and the amount of data in the packet p2 exceeds the communication bandwidth of the communication line L1, it is recognized that the Tx buffer bf1 is filling up with data.

In this situation, it is expected that the packet interval (or "interframe gap" (IFG)) of packets transmitted to the node #00 will continuously be 12 bytes or less.

Accordingly, when the IFG is 12 bytes or less continuously for a certain period, the node #00 determines that there is a sign of congestion at the TX buffer bf1 in the switch SW #0.

Alternatively, the node #00 determines that there is a sign of congestion at the Tx buffer bf1 in the switch SW #0 when the rate of a valid data part that excludes the IFG/preamble equals or exceeds a threshold.

Examples of control for determining a sign of congestion and performing other determinations are described in (1d) to (3c) below.

(1d) When the amount of data in the valid region of a received packet (as one example, for Ethernet, a part that excludes the IFG/preamble) has exceeded a threshold for a certain period, the node #00 assumes that data is being received at the full rate and determines that packets are continuously accumulating in the Tx buffer bf1 in the switch SW #0, or in other words, that there is a sign of congestion at the Tx buffer bf1.

(2d) The node #00 monitors the packet interval of packets that are received, and when a certain threshold (for example, 12 bytes) or less continues for a certain period, the node #00 determines that packets are continuously accumulating in the Tx buffer bf1 in the switch SW #0, or in other words, that there is a sign of congestion at the Tx buffer bf1.

(3d) The node #00 monitors the length of delimiters (preambles, postambles, or the like) of packets that are received, and when a certain threshold (for example, 6 bytes) or lower continues for a certain period (for example, 1 µs), determines that packets are continuously accumulating in the Tx buffer bf1 in the switch SW #0, or in other words, that there is a sign of congestion at the Tx buffer bf1.

Note that the monitoring time and/or the packet rate used as the conditions for detecting a sign of congestion may be provided with hysteresis. By providing hysteresis, it becomes possible to suppress variation in the detection of a sign of congestion and thereby perform stable flow control.

Since it is desirable for the detection of a sign of congestion at the Tx buffer in a switch SW to detect a sign of congestion earlier and more accurately in keeping with the characteristics of the switch in question and the application being used, it is possible to combine the various control processes described in (1d) to (3d) above.

When a sign of congestion has been detected by a determination method as described above, a control packet for a transmission stop request is transmitted to the nodes that are transmitting the packets.

Detection of Disappearance of Sign of Congestion

Figure 18:
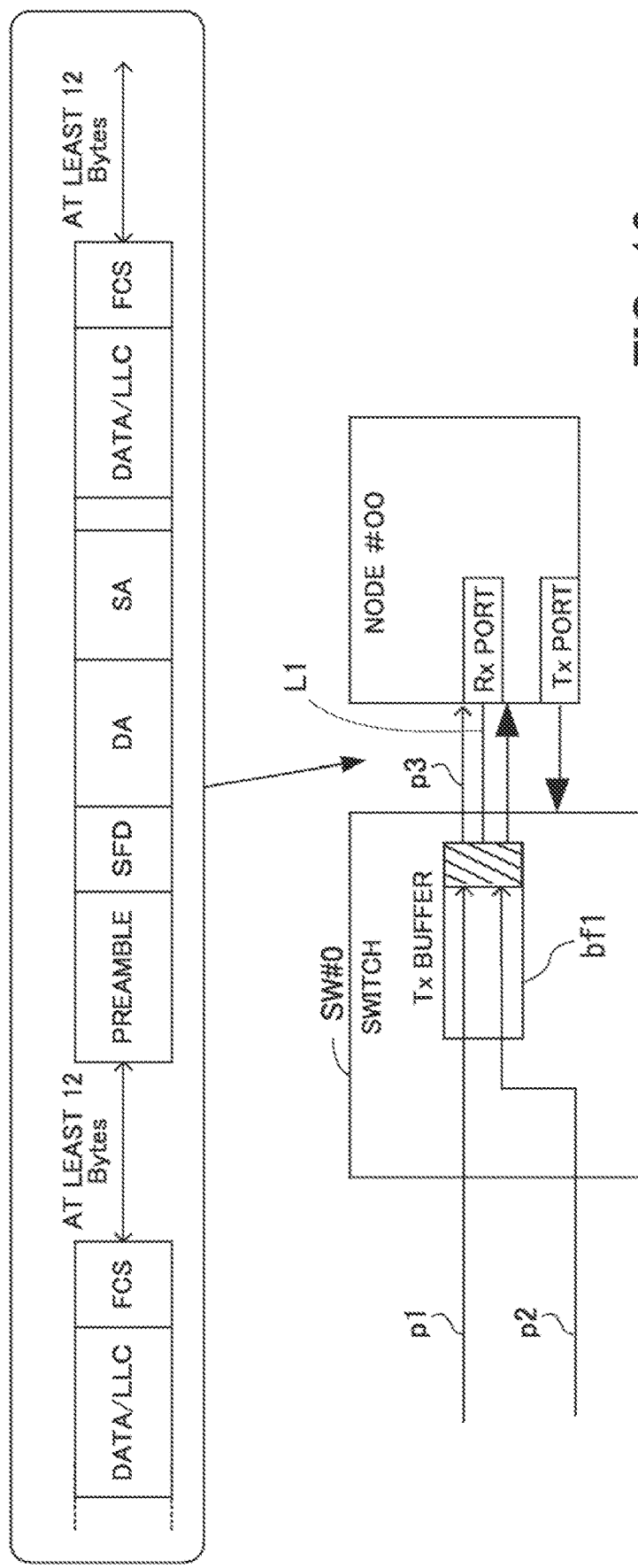
FIG. 18 depicts an example of where disappearance of the sign of congestion is detected.

FIG. 18 depicts an example of where disappearance of the sign of congestion is detected. It is assumed here that packets (packet streams) p1 and p2 are inputted into the switch SW #0 and buffered in the Tx buffer bf1, and the buffered packets (packet stream) p3 are then transmitted to the node #00 via the communication line L1.

By monitoring the rate of received packets at the node #00, it is determined whether the sign of congestion at the Tx buffer bf1 in the switch SW #0 has disappeared. In the example in FIG. 18, when the sum of the amount of data in the packet p1 and the amount of data in the packet p2 is smaller than the communication bandwidth of the communication line Ll, it is recognized that the Tx buffer bf1 is emptying of data. When this happens, the packet interval of the packets transmitted to the node #00 often exceeds 12 bytes.

Accordingly, when a period for which the IFG is longer than 12 bytes is equal to or exceeds a certain period, the node #00 determines that the sign of congestion at the Tx buffer bf1 in the switch SW #0 has disappeared.

Alternatively, when the rate of the valid data part that excludes the IFG/preamble falls below a threshold, the node #00 determines that the sign of congestion at the Tx buffer bf1 in the switch SW #0 has disappeared.

Examples of control for determining disappearance of the sign of congestion and performing other determinations are described in (1e) to (3e) below.

(1e) When the amount of data in the valid regions of received packets falls below the threshold for a certain period, the node #00 assumes that data is not being received at the full rate and determines that there is no accumulation of packets (or "emptying") at the Tx buffer in the switch SW, or in other words, that there is no congestion.

(2e) The node #00 monitors the packet interval of received data, and when a certain threshold (for example, 12 bytes) is continuously exceeded for a certain period (for example, 1 µs), the node #00 determines that there is no accumulation of packets (or "emptying") at the Tx buffer in the switch SW, or in other words, that there is no congestion.

(3e) The node #00 monitors the length of delimiters (preambles, postambles, or the like) of received data, and when a certain threshold (for example, 6 bytes) is continuously exceeded for a certain period, determines that there is no accumulation of packets (or "emptying") at the Tx buffer in the switch SW, or in other words, that there is no congestion.

Note that the monitoring time and/or the packet rate used as the conditions for detecting the disappearance of the sign of congestion may be provided with hysteresis. By providing hysteresis, it becomes possible to suppress variation in the detection of the disappearance of the sign of congestion and thereby perform stable flow control.

Since it is desirable for the detection of the disappearance of the sign of congestion to detect the disappearance of the sign of congestion faster and more accurately in keeping with the characteristics of the switch in question and the application being used, it is possible to combine the various control processes described in (1e) to (3e) above.

When disappearance of the sign of congestion has been detected by a determination method as described above, a control packet for a transmission stop cancelling request is transmitted to the nodes that are transmitting the packets.

Flowchart

Figure 19:
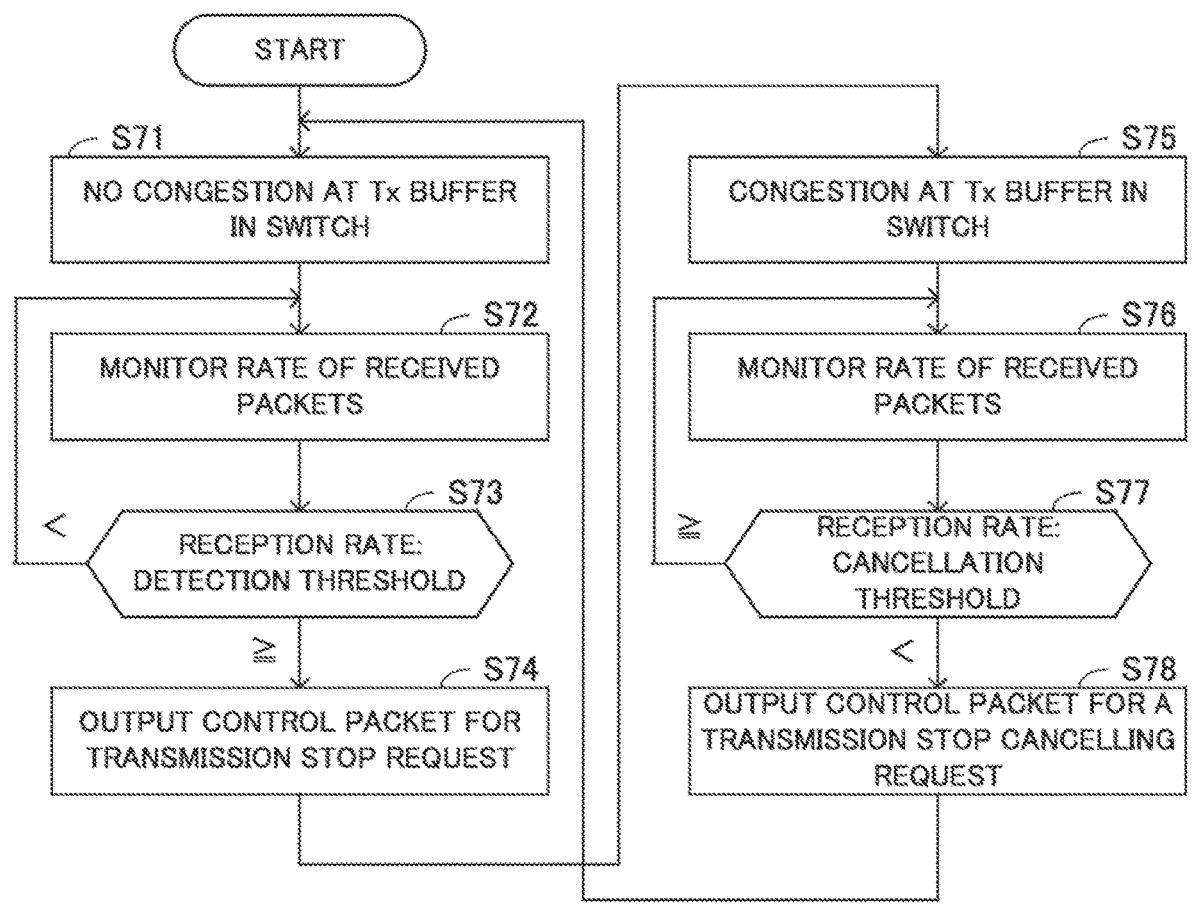
FIG. 19 is a flowchart depicting an example operation of a receiver node.

FIG. 19 is a flowchart depicting an example operation of a receiver node.

(Step S71) The Tx buffer in the switch SW is in a state where there is no congestion (or no sign of congestion).

(Step S72) The control unit 11 of the receiver node monitors the rate of received packets.

(Step S73) The control unit 11 compares the reception rate with a detection threshold. When the detection threshold exceeds the reception rate (that is, when reception rate<detection threshold), the processing returns to step S72, and when the reception rate is equal to or higher than the detection threshold (reception rate≥ detection threshold), the processing proceeds to step S74.

(Step S74) The control unit 11 in the receiver node outputs a control packet for a transmission stop request.

(Step S75) There is a sign of congestion at the Tx buffer in the switch SW.

(Step S76) The control unit 11 in the receiver node monitors the rate of the received packets.

(Step S77) The control unit 11 in the receiver node compares the reception rate with a cancellation threshold. When the reception rate is equal to or higher than the cancellation threshold (that is, when the reception rate≥ the cancellation threshold), the processing returns to step S76, and when the cancellation threshold exceeds the reception rate (that is, when the reception rate<cancellation threshold), the processing proceeds to step S78.

(Step S78) The control unit 11 in the receiver node outputs a control packet for a transmission stop cancelling request. The processing then returns to the state in step S71.

Figure 20:
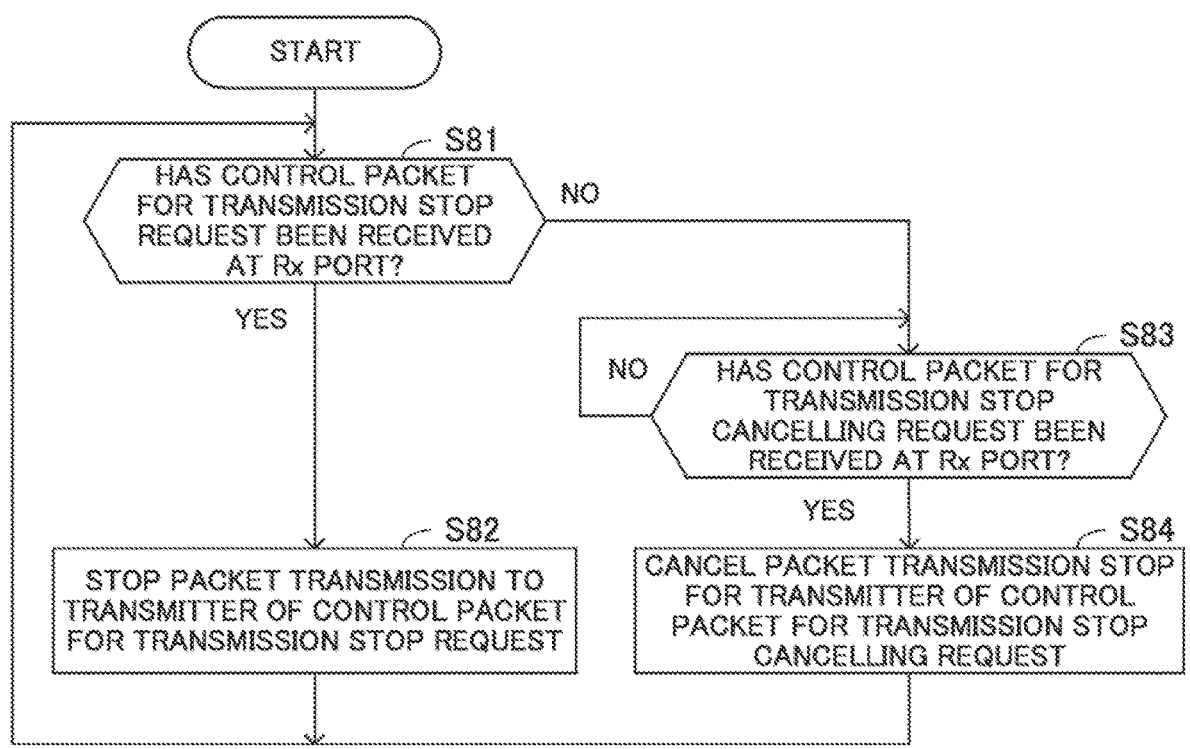
FIG. 20 is a flowchart depicting an example operation of a transmitter node.

FIG. 20 is a flowchart depicting an example operation of a transmitter node. Note that the flow depicted in FIG. 20 is for an example case where the transmission of packets is stopped when the transmitter node receives a control packet for a transmission stop request.

(Step S81) The control unit 11 in the transmitter node determines whether a control packet for a transmission stop request has been received at the Rx port. When a control packet for a transmission stop request has been received, the processing proceeds to step S82, and when no control packet has been received, the processing proceeds to step S83.

(Step S82) The control unit 11 in the transmitter node stops the transmission of packets to the receiver node that transmitted the control packet for the transmission stop request. The processing then returns to the processing in step S81.

(Step S83) The control unit 11 in the transmitter node determines whether a control packet for a transmission stop cancelling request has been received at the Rx port. When a control packet for a transmission stop cancelling request has been received, the processing proceeds to step S84, and when a control packet has not been received, the processing in step S83 is repeated.

(Step S84) The control unit 11 in the transmission node cancels the packet transmission stop for the receiver node that transmitted the control packet for a transmission stop cancelling request. The processing then returns to the processing in step S81.

As described above, according to the present embodiments, on an HPC network that uses switches, a sign of congestion at the Tx buffer in a switch SW is detected at a receiver node and when data congestion occurs, congestion control is performed without using a Pause packet. By doing so, it is possible to avoid the occurrence of congestion while preventing a situation where the transmission of packets by every node stops.

In addition, the present embodiments have the following effects numbered (1) to (8).

(1) Since there is no need to collectively stop all packets when data congestion occurs, an improvement in transmission efficiency is expected.

(2) Since there is no collective stopping of packets and control is performed for each connection flow between nodes, the effect of the present embodiments will increase as the number of connected nodes rises.

(3) When a large-scale network in which many nodes are connected in a multidimensional torus network is virtually constructed using Ethernet switches, Ethernet switches will be cascaded in multiple stages. Since the present embodiments do not generate Pause packets, it is possible to avoid pressure applied to the transmission bandwidth due to the Pause packets, so that a significant improvement in transmission efficiency is expected.

(4) Since the monitoring process is performed in a distributed manner by the receiver nodes, individual flows are precisely controlled.

(5) By having a receiver node that receives packets identify the transmitter nodes that are transmitting the packets which are causing congestion, it is possible to make full use of the bandwidth of the receiver node without having to provide limitations on the bandwidth occupied by each transmitter node.

(6) For packet transmission by a transmitter node that is causing congestion, by selecting and setting stopping, stop processing where priorities are considered, or transmission rate lowering processing individually for each node, it is possible to perform precise control in keeping with the importance of each communication service and an improvement in transmission rate is expected.

(7) Since direct flow control may be performed from a receiver node, control is highly responsive, which makes it possible to avoid decreases in transmission efficiency.

(8) The above effects may be realized using relatively inexpensive Ethernet switches that are commercially available.

The communication apparatus 1 and the node 10 according to the present embodiments described above may be realized by computers. When doing so, programs in which the processing contents of the functions to be provided in the communication apparatus 1 and the node 10 are provided. By executing these programs on computers, the processing functions described above are realized on the computers.

The programs in which the processing content is written may be recorded on computer-readable recording media. Computer-readable recording media include magnetic storage units, optical discs, magneto-optical recording media, and semiconductor memories. Magnetic storage units include hard disk drives (HDD), flexible disks (FD), and magnetic tapes. Optical discs include CD-ROM/RW. Magneto-optical recording media include Magneto-Optical (MO) discs.

When distributing a program, as one example, a portable recording medium such as a CD-ROM on which the program has been recorded is sold. It is also possible to store the program in the storage unit of a server computer and transfer the program from the server computer to another computer via a network.

As one example, the computer that is to execute a program stores a program recorded on a portable recording medium or a program transferred from a server computer in its own storage unit. The computer then reads out the program from its own storage unit and executes processing according to the program. Note that it is also possible for a computer to read out the program directly from a portable recording medium and execute processing according to the program.

It is also possible for a computer to sequentially execute processing according to a received program every time the program is transferred from a server computer connected via a network. At least some of the processing functions described above may be realized by an electronic circuit such as an FPGA, a DSP, an ASIC, or a PLD.

Although embodiments have been described above, the configurations of the respective elements described in the embodiments may be replaced with other elements with similar functions. It is also possible to add other components and/or processes. Additionally, any two or more configurations (features) of the embodiments described above may be combined.

Note that it is also possible to apply the present embodiments to networks aside from an Ethernet so long as the communication makes it possible to identify a transmitter apparatus that is transmitting packets (that is, communication where it is possible to determine the transmitter address).

As specific examples, the present embodiments are widely applicable to networks such as an Asynchronous Transfer Mode (ATM) network, digital access (DA-L2), a frame relay, Attached Resource Computer Network (ARC-NET), and Open Shortest Path First (OSPF). In addition, the present embodiments are applicable to embedded systems, for example, embedded Ethernet.

According to the present embodiments, it is possible to avoid congestion while also preventing transmission of packets from stopping for all nodes.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A communication apparatus comprising:
 a communication port that receives packets transmitted from a switch; and
 a controller that monitors at least one of a first reception frequency of the packets received at the communication port, a second reception frequency of the packets received at the communication port or a length of a delimiter of the packets, detects a sign of congestion at a buffer inside the switch based on the first reception frequency, the second reception frequency or the length, and sends, based on a result of the detecting, a transmission stop request for the packets to a transmitter apparatus that transmits the packets before the buffer becomes congested,
 wherein
 the first reception frequency is a state where a reception interval of the packets is equal to or below a predetermined value, and the second reception frequency is a reception rate of valid data parts of the packets,
 the controller detects that there is the sign of congestion at the buffer when the state where the reception interval is equal to or below the predetermined value continues for a predetermined period,
 the controller detects that there is the sign of congestion at the buffer when the reception rate is equal to or above a threshold, and
 the controller detects that there is the sign of congestion when the length is equal to or shorter than a threshold continuously for a certain period
 wherein when a sign of congestion has been detected at the buffer, the controller sends the transmission stop request appended with a priority to the transmitter apparatus to cause the transmitter apparatus to output high-priority packets and stop transmission of low-priority packets based on the priority.

2. The communication apparatus according to claim 1, wherein when a sign of congestion has been detected at the buffer, the controller sends the transmission stop request to the transmitter apparatus to stop transmission of the packets from the transmitter apparatus.

3. The communication apparatus according to claim 1, wherein when a sign of congestion has been detected at the buffer, the controller sends the transmission stop request to the transmitter apparatus to lower a transmission rate of the packets from the transmitter apparatus.

4. The communication apparatus according to claim 1, wherein when disappearance of the sign of congestion at the buffer in the switch has been detected based on the reception frequency, the controller sends a transmission stop cancelling request for the packets to the transmitter apparatus of the packets to restore a packet transmission state before the transmission stop request.

5. The communication apparatus according to claim 4, wherein the controller monitors, as the reception frequency, a state where a reception interval of the packets exceeds a predetermined value, and detects that the sign of congestion at the buffer has disappeared when a state where the predetermined value is exceeded continues for a predetermined period.

6. The communication apparatus according to claim 4, wherein the controller monitors, as the reception frequency, a reception rate of valid data parts of the packets and detects that the sign of congestion at the buffer has disappeared when the reception rate is below a threshold.

7. The communication apparatus according to claim 1, wherein the controller sends the transmission stop request including a timer value that sets a transmission stop time and cause the transmitter apparatus of the packets to stop transmission of the packets for the transmission stop time and recommence the transmission of the packets after the transmission stop time has elapsed.

8. A communication method comprising:
 monitoring, by a computer, at least one of a first reception frequency of packets received at a communication port, a second reception frequency of the packets received at the communication port or a length of a delimiter of the packets, the communication port receiving the packets that are transmitted from a switch;

detecting, by the computer, a sign of congestion at a buffer inside the switch based on the first reception frequency, the second reception frequency or the length and sending, by the computer, a transmission stop request for the packets to a transmitter apparatus that transmits the packets before the buffer becomes congested, based on a result of the detecting, wherein the first reception frequency is a state where a reception interval of the packets is equal to or below a predetermined value, and the second reception frequency is a reception rate of valid data parts of the packets, the computer detects that there is the sign of congestion at the buffer when the state where the reception interval is equal to or below the predetermined value continues for a predetermined period, the computer detects that there is the sign of congestion at the buffer when the reception rate is equal to or above a threshold, and the computer detects that there is the sign of congestion when the length is equal to or shorter than a threshold continuously for a certain period, wherein when a sign of congestion has been detected at the buffer, the computer sends the transmission stop request appended with a priority to the transmitter apparatus to cause the transmitter apparatus to output high-priority packets and stop transmission of low-priority packets based on the priority.

* * * * *